May 23, 1967 J. T. DENNIS 3,321,205

AUTOMATIC RECORD CHANGER

Filed March 15, 1963 15 Sheets-Sheet 1

INVENTOR.
JAMES T. DENNIS
BY Mason, Kolehmainen, Rathburn and Wyss
ATTORNEYS.

May 23, 1967 J. T. DENNIS 3,321,205

AUTOMATIC RECORD CHANGER

Filed March 15, 1963

15 Sheets-Sheet 2

INVENTOR.
JAMES T. DENNIS
BY Mason, Kolehmainen, Rathburn and Wyss
ATTORNEYS

May 23, 1967 J. T. DENNIS 3,321,205

AUTOMATIC RECORD CHANGER

Filed March 15, 1963

15 Sheets-Sheet 3

INVENTOR.
JAMES T. DENNIS
BY Mason, Kolehmainen, Rathburn and Wyss
ATTORNEYS.

INVENTOR.
JAMES T. DENNIS
BY
Mason, Kolehmainen, Rathburn and Wyss
ATTORNEYS.

May 23, 1967 J. T. DENNIS 3,321,205

AUTOMATIC RECORD CHANGER

Filed March 15, 1963

15 Sheets-Sheet 5

INVENTOR.
JAMES T. DENNIS
BY Mason, Kolehmainen, Rathburn and Wyss
ATTORNEYS

INVENTOR.
JAMES T. DENNIS
BY Mason, Kolehmainen, Rathburn and Wyss.

INVENTOR.
JAMES T. DENNIS
BY Mason, Kolehmainen, Rathburn and Wyss.
ATTORNEYS.

INVENTOR.
JAMES T. DENNIS
BY Mason, Kolehmainen
Rathburn and Wyss,
ATTORNEYS

INVENTOR.
JAMES T. DENNIS
BY Mason, Kolehmainen, Rathburn and Wyss
ATTORNEYS.

INVENTOR.
JAMES T. DENNIS
BY Mason, Kolehmainen, Rathburn and Wyss
ATTORNEYS

INVENTOR.
JAMES T. DENNIS
BY
Mason, Kolehmainen, Rathburn and Wyss
ATTORNEYS.

May 23, 1967 J. T. DENNIS 3,321,205

AUTOMATIC RECORD CHANGER

Filed March 15, 1963 15 Sheets-Sheet 12

INVENTOR.
JAMES T. DENNIS
BY Mason, Kolehmainen, Rathburn and Wyss
ATTORNEYS.

INVENTOR.
JAMES T. DENNIS
BY Mason, Kolehmainen, Rathburn and Wyss
ATTORNEYS

INVENTOR.
JAMES T. DENNIS
BY Mason, Kolehmainen, Rathburn and Wyss
ATTORNEYS

INVENTOR.
JAMES T. DENNIS
BY Mason, Kolehmainen
Rathburn and Wyss
ATTORNEYS.

United States Patent Office 3,321,205

Patented May 23, 1967

3,321,205

AUTOMATIC RECORD CHANGER

James T. Dennis, 812 American National Bldg., Oklahoma City, Okla. 73102

Filed Mar. 15, 1963, Ser. No. 265,421
28 Claims. (Cl. 274—10)

The present invention relates to automatic phonograph apparatus, and, more particularly to a new and improved automatic record changer for phonograph apparatus.

In present day automatic record changers it is customary to provide a so-called manual play arrangement wherein the balance arm, which is normally placed on top of the record stack, is moved upwardly and outwardly to a position over the tone arm so that one record can be manually placed on the turntable and played in the manner of a manual player. In these arrangements the tone arm is usually indexed in accordance with the position of an indexing member which is struck by the outer edge portion of a record as it is deposited on the turntable during the record changing cycle. Accordingly, when the changer is used for manual playing, in which case the tone arm indexing member is not in operation when the record is deposited manualy on the turntable before the record changing cycle is initiated, the automatic changing mechanism brings the tone arm to a position over the turntable and lowers it irrespective of the size of the record on the turntable, which necessitates manual readjustment of the tone arm. A further disadvantage in many changers has been the fact that should an automatic cycle be initiated without a record on the changer the tone arm will be dropped onto the rotating turntable with consequent damage to the stylus. Also, even if a record is present on the turntable the tone arm may be deposited at some point other than the lead-in groove of the record, unless the record has a seven inch diameter, so that the operator must manually place the tone arm on the record with the consequent danger of scratching the same. This defect has markedly reduced the attractiveness of most automatic record changers for manually playing a record and has led many people to employ a single record player when a record is to be played manually since these players usually provide a lowering device for moving the stylus into engagement with the record without scratching the same.

In many instances, it is also desirable to provide a simple arrangement in which a single selected record may be placed on the turntable and played over and over again automatically. For example, in the classroom and educational work, the studying of languages, dancing instruction, and similar situations, it would be desirable to provide a repeat play arrangement in which a particular record could be played over and over again automatically and without requiring further attendance after the record is placed on the turntable. Furthermore, this repeat play arrangement should include facilities whereby a record of any of the standard diameters may be played repeatedly. While certain changers heretofore proposed have provided an arrangement for repeatedly playing one record, these arrangements have in general been limited to the repeated playing of records of only one size. Also, these arrangements have been quite complicated and have required the provision of additional control knobs or levers which must be actuated to place the changer in a repeat play condition.

It is, therefore, one of the important objects of the present invention to provide an automatic record changer in which improved and simplified facilities are provided for repeatedly playing a record on the turntable in a fully automatic manner.

It is another object of the present invention to provide a new and improved automatic record changer wherein improved facilities are provided for manually playing a single record without scratching the record.

It is a further object of the present invention to provide a new and improved automatic record changer in which movement of the balance arm to a position generally above the lead-in groove of a record is employed to cause the changer to play this record over and over again without further attendance on the part of the operator.

It is a still further object of the present invention to provide a new and improved automatic record changer wherein positioning of the balance arm is employed to control tone arm indexing so that a single record of any size may be played manually and the tone arm automatically lowered into engagement with the lead-in groove thereof without scratching the record.

It is another object of the present invention to provide a new and improved automatic record changer in which movement of the balance arm to a position generally above the lead-in groove of a record of any standard diameter is employed to cause the changer to play this record repeatedly and to index the tone arm for engagement with the lead-in groove of this record in an automatic manner.

It is a further object of the present invention to provide a new and improved automatic record changer in which the balance arm is provided with a series of detent positions corresponding to the diameters of seven inch, ten inch and twelve inch records and in each of these detent positions the changer is arranged to play repeatedly a record of a diameter corresponding to the detent position of the balance arm.

It is a still further object of the present invention to provide a new and improved automatic record changer wherein means are provided responsive to movement of the balance arm to a position remote from the spindle for causing the tone arm to be indexed to a position corresponding to twelve inch records irrespective of the presence or absence of a record on the turntable or the diameter of such record.

Another object of the present invention is to provide a new and improved automatic record changer wherein means are provided responsive to the positioning of the balance arm in the vicinity of the tone arm rest post for indexing the tone arm so that it is lowered at a point beyond the edge of the turntable irrespective of the actual diameter of the record being played.

A further object of the present invention is to provide a new and improved automatic record changer wherein the tone arm indexing member is automatically moved to the twelve inch record position in response to movement of the balance arm to a position in the vicinity of the tone arm rest post so that the tone arm is indexed to a position corresponding to twelve inch records irrespective of the actual diameter of the records deposited on the turntable.

In many of the present day automatic record changers, there is a tendency for the needle to skip or skate inwardly over the initial grooves of the record when the needle is first lowered onto the record. This skipping or skating tendency may be due to any one of a number of factors such as the tone arm pivoting arrangement, improper levelling of the record changer itself or, in the case of some high fidelity records, a raised outer edge portion which slopes downwardly to the sound grooves of the record. Certain arrangements have been heretofore proposed to provide a restraining force on the tone arm for preventing inward skipping or skating of the needle over the first few grooves of the record at the beginning of the playing cycle. One such arrangement is shown, for example, in my application Ser. No. 168,305, filed Jan. 16, 1962, now Patent No. 3,254,896. While the arrangement shown in my copending application is entirely satisfactory for its intended purpose, it would be desirable to provide a cycling mechanism in which the tone arm restraining force is removed by movement of the cycling slide and movement of this slide is so controlled that the restraining force is not removed until substantially the end of the record changing cycle. Furthermore, in connection with certain types of automatic record changers, usually provided for high fidelity installations, it is customary to mute or short circuit the terminals of the tone arm cartridge during the record changing cycle so that objectionable noises are not introduced into the amplifier system during the record changing cycle. However, in these muting arrangements the tone arm cartridge is restored to normal operation at about the point at which the tone arm strikes the record since with conventional cycling mechanisms there is little movement of the mechanism after the tone arm is deposited on the record which can be used to control the muting switch. Under these circumstances when the needle strikes the slick surface of the outer edge portion of the record the cartridge is not muted and hence an undesirable hissing noise is produced in the loudspeaker as the needle traverses this slick surface.

It is a further important object of the present invention to provide a new and improved automatic record changer which includes means for exerting a restraining force on the tone arm which is removed in accordance with movement of the cycling slide at the end of the record changing cycle.

It is a still further object of the present invention to provide a new and improved automatic record changer wherein a restraining force is exerted on the tone arm as it is deposited on the record to prevent inward skipping thereof over the initial grooves of the record and movement of the cycling slide is delayed in such manner as to cause this restraining force to be removed at substantially the end of the record changing cycle.

It is another object of the present invention to provide a new and improved automatic record changer wherein movement of the cycling slide is employed to control muting of the tone arm cartridge and movement of this slide is delayed during the latter portion of the record changing cycle so that the tone arm cartridge remains muted for a substantial interval after the needle has engaged the record.

It is still another object of the present invention to provide a new and improved automatic record changer wherein the tone arm cartridge is muted in accordance with movement of the cycling slide and movement of this slide to its final position is delayed so that the muting switch is not opened until substantially the end of the record changing cycle and after the tone arm stylus has engaged a record for substantially one revolution.

It is a still further object of the present invention to provide a new and improved automatic record changer wherein a unique cycling slide control mechanism is provided which produces an abrupt movement of the cycling slide at substantially the end of the record changing cycle while providing a changing mechanism of relatively short total length.

It is another object of the present invention to provide a new and improved automatic record changer wherein a unique cycling slide drive arrangement is provided wherein the slide is given an abrupt movement at substantially the end of the record changing cycle without materially increasing the complexity of the cycling slide drive mechanism.

In most automatic record changers an automatic shutoff mechanism is provided so that the turntable drive motor is turned off and the idler wheel placed in a neutral position automatically. This automatic shutoff arrangement has conventionally included facilities whereby the machine may be shut off either in response to dropping of the balance arm after the last record has been played or the operation of a control knob to an off position. These prior arrangements have in general left much to be desired in the way of reliability and positive shutoff action because they have employed either movement of the cycling member or the inertia of the turntable itself to provide the power necessary to actuate the motor switch and move the idler wheel to the neutral position. Use of the coasting or inertia of the turntable is particularly unsatisfactory when an automatic shutoff is required at a relatively slow turntable speed, such as 16⅔ r.p.m. Also, in many prior art arrangements the movement of the shutoff mechanism has been slow so that the motor switch contacts arc as they are slowly opened which causes a disturbance in the associated sound system and reduces the life of the switch.

It is, therefore, a further important object of the present invention to provide a new and improved automatic record changer wherein a simple, reliable and positive acting automatic shutoff mechanism is provided.

It is a still further object of the present invention to provide a new and improved automatic record changer wherein power for actuating the motor switch and idler wheel movement on automatic shutoff is provided by means of a spring in which energy is stored at substantially the end of the record changing cycle.

It is another object of the present invention to provide a new and improved automatic record changer wherein an automatic shutoff mechanism is provided in which rapid movement of a spring biased lever is employed to provide a fast break action of the motor switch contacts.

It is still another object of the present invention to provide a new and improved auomatic record changer wherein an automatic shutoff arrangement is provided which is effective to hold the motor switch in the off position despite movements of the rubber mounted motor subassembly when the changer is carried or moved about.

It is a further object of the present invention to provide a new and improved automatic record changer wherein the load on the cycling mechanism is uniformly distributed so that the power necessary to provide automatic shutoff does not cause an overload on the cycling mechanism.

It is another object of the present invention to provide a new and improved automatic record changer wherein the load placed on the cycling mechanism is rendered more uniform by effectively disengaging the cycling slide from the driving mechanism during at least a portion of the period when power is stored in the automatic shutoff mechanism.

A further object of the present invention resides in the provision of a new and improved automatic record changer wherein an automatic shutoff function is provided in a simple, economical and reliable manner by elevating the main gear while it is rotating during the record changing cycle in which automatic shutoff is to be achieved.

A still further object of the present invention is to provide a new and improved automatic record changer wherein a smple anid reliable spindle actuating mechanism is provided for releasing a record onto the turntable in response to rotary movement of a main cycling gear.

Another object of the present invention resides in the provision of a new and improved automatic record changer wherein the spindle actuating mechanism is operated in response to movement of a main cycling gear and elevation of this gear is employed to disengage the spindle actuating mechanism so that no record is dropped when the machine is turned off.

Still another object of the present invention resides in the provision of a new and improved spindle actuating mechanism for an automatic record changer whch is extremely simple and economical in construction and can be manufactured on a mass production basis.

A further object of the present invention resides in the provision of a new and improved automatic record changer wherein an improved and simplified bearing construction is provided for mounting the balance arm.

A still further object of the present invention resides in the provision of a new and improved mounting arrangement for the balance arm in an automatic record changer whereby cooperation with an associated automatic shutoff mechnism is positively provided and may be separately tested before the changer is finally assembled.

It is another object of the present invention to provide a new and improved velocity trip mechanism for use in an automatic record changer which provides positive tripping action with an extremely low stylus pressure on the tone arm.

It is a further object of the present invention to provide a new and improved velocity trip mechanism which may be simply and economically constructed and which can be assembled with a minimum of effort on a mass production basis.

It is a still further object of the present invention to provide a new and improved velocity trip mechanism for use in an automatic record changer wherein positive tripping action is provided and this mechanism is reset in a simple and positive manner.

It is another object of the present invention to provide a new and improved automatic record changer wherein a main subassembly is provided which includes the tone arm mounting and indexing mechanisms, the balance arm mounting mechanism and the spindle mounting mechanism as a unit which can be separately tested before assembly on a base plate.

It is still another object of the present invention to provide a new and improved automatic record changer wherein substantially all of the parts of the record changer are contained in a motor subassembly and a main base subassembly, each of which may be separately tested before assembly to a main base plate to facilitate manufacture of the changer on a mass production basis.

It is a further object of the present invention to provide a new and improved automatic record changer, the parts of which are particularly designed to be assembled in sequence with a minimum number of fastening devices so that the changer may be economically manufactured on a mass production basis.

It is another object of the present invention to provide a new and improved tone arm indexing arrangement for an automatic record changer wherein facilities are provided for positively indexing the tone arm to seven, ten and twelve inch record positions as well as a position over the tone arm rest post while employing a minimum number of parts which may be readily assembled on a mass production basis.

It is still another object of the present invention to provide a new and improved control linkage arrangement for an automatic record changer wherein the control knob may be held during the automatic record changing cycle without causing the mechanism to jam and without transmitting reaction forces back to the control knob.

The invention, both as to its organization and method of operation, together with further objects and advantages thereof, will best be understood by reference to the following specification taken in connection with the accompanying drawings in which:

FIG. 18 is a sectional view taken along the lines 18—18 of FIG. 17;

Figures 1, 1A:
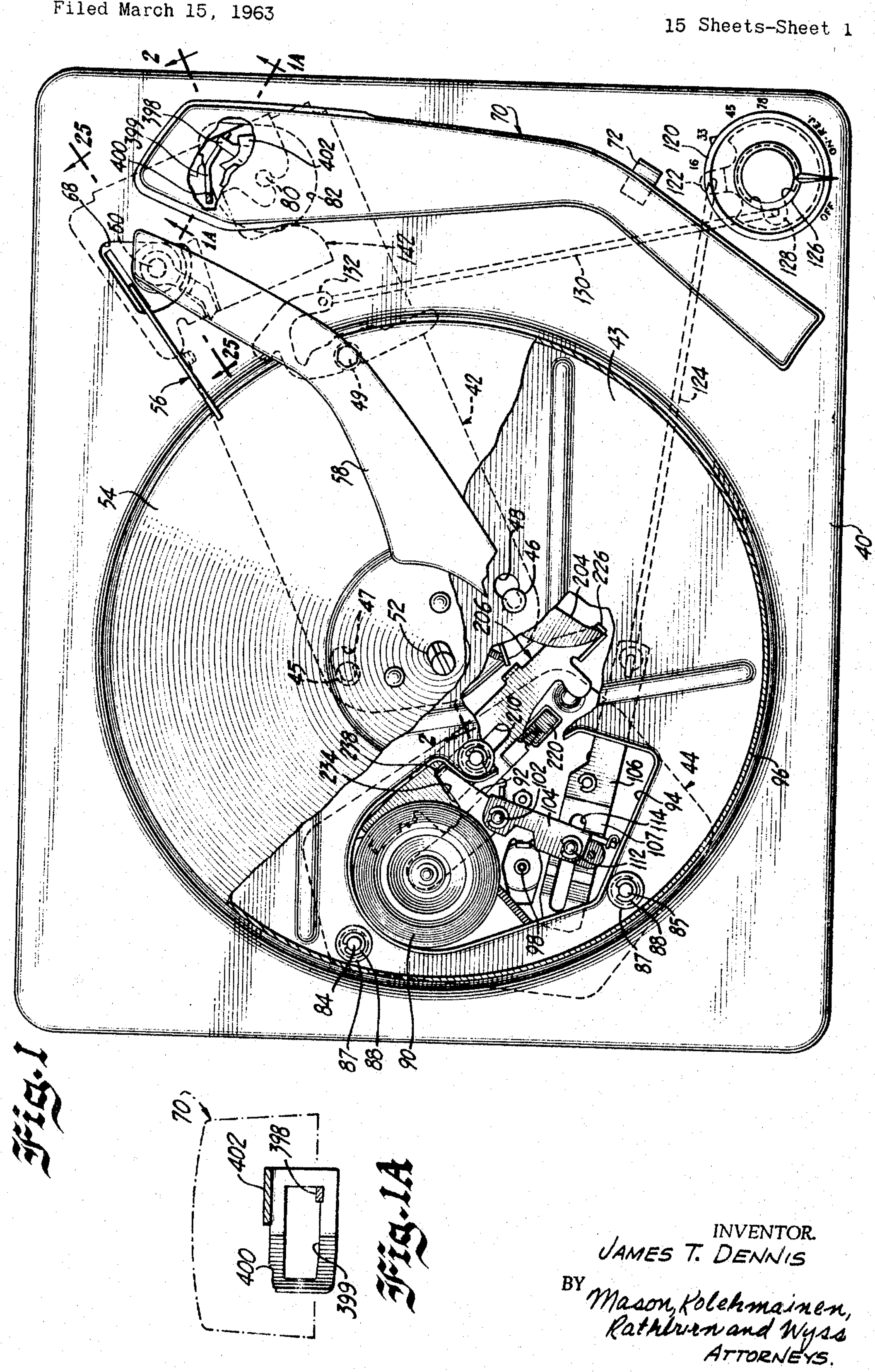
FIG. 1 is a plan view of an automatic record changer embodying the features of the present invention and showing the parts of the changer in rest position.
FIG. 1A is a fragmentary sectional view taken along the lines 1A—1A of FIG. 1.

Referring now to the drawings, and more particularly to FIGS. 1–30 thereof, the automatic record changer of the present invention is therein illustrated as comprising a main base plate 40 (FIG. 1) on which is mounted a main base subassembly indicated generally in outline at 42 and a motor subassembly indicated generally in outline at 44. The main base assembly 42 is mounted on a depressed central portion 43 of the main base plate 40 by means of a pair of mounting posts 45 and 46 the upper ends of which are positioned within keyhole openings 47 and 48, and a main mounting screw 49 which threads into the mounting post 50 (FIG. 3) on the main base subassembly 42. The main base subassembly 42 includes a record supporting spindle 52 on the hub of which is rotatably mounted a turntable 54. The subassembly 42 also includes a pivotally mounted tone arm indexing member 56 and a balance arm 58. The arm 58 is arranged to be moved inwardly to a position adjacent the spindle 52 to maintain a stack of records positioned on this spindle in horizontal position and may be moved outwardly beyond the record stack when it is desired to remove records from the turntable 54. The balance arm 58 is mounted on the upper end of a balance arm shaft 60 which is slidably and rotatably mounted in a generally cylindrical bearing housing 62 which is mounted on the main base subassembly 42. As shown in FIG. 2, the tone arm indexing member 56 is provided with head portion 64 having an inclined edge portion 66 which is adapted to be struck by the outer edge portion of records of ten and twelve inch diameters when they are released by the spindle 52 to the turntable 54. The head portion 64 is connected to a shank portion 67 which is pivotally mounted on the main base subassembly 42, as will be described in more detail hereinafter. Both the shank portion 67 and the housing 62 extend through a clearance opening 68 in the main base plate 40.

Figures 3, 12:
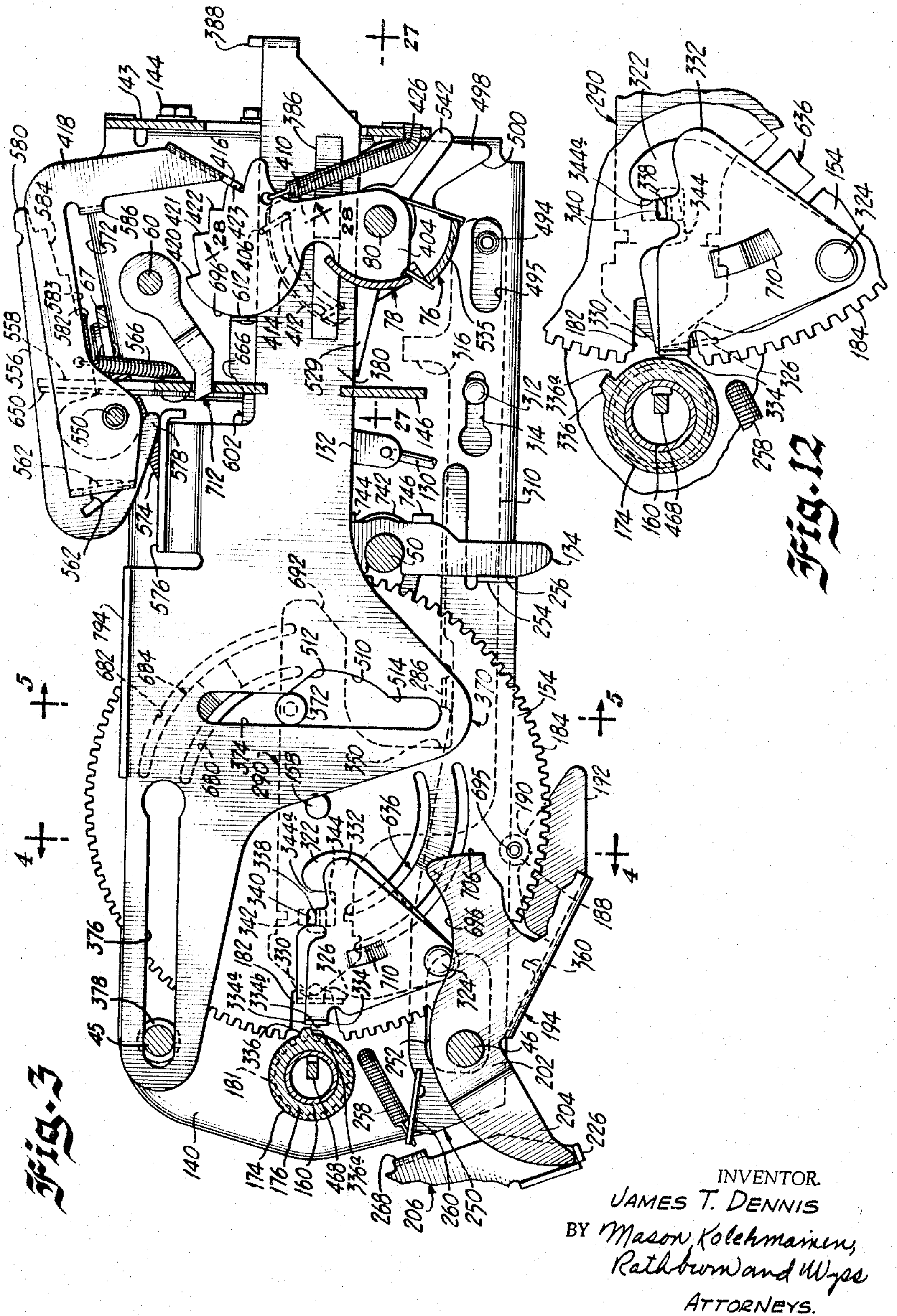
FIG. 3 is a fragmentary, sectional plan view taken along lines 3—3 of FIG. 2.
FIG. 12 is a fragmentary plan view of a portion of FIG. 3 showing the velocity trip mechanism being actuated.

A tone arm assembly indicated generally at 70 is also pivotally mounted on the main base subassembly 42 and is arranged to be positioned on a rest post 72, secured to the base plate 40, when the record changer is not in use. Movement of the tone arm assembly 70 is controlled by a means of a U-shaped tone arm bracket 76 (FIG. 6) and a U-shaped tone arm index bracket 78 which are pivotally mounted on a tone arm pivot post 80 (FIG. 3). A clearance opening 82 in the main base plate 40 is provided for the members 76, 78 and 80 so that the tone arm assembly 70 is supported solely on the main subassembly 42 and vibrations of the main base plate 40 in the vicinity of the opening 82 are not transmitted to the tone arm assembly 70.

Figures 6, 7:
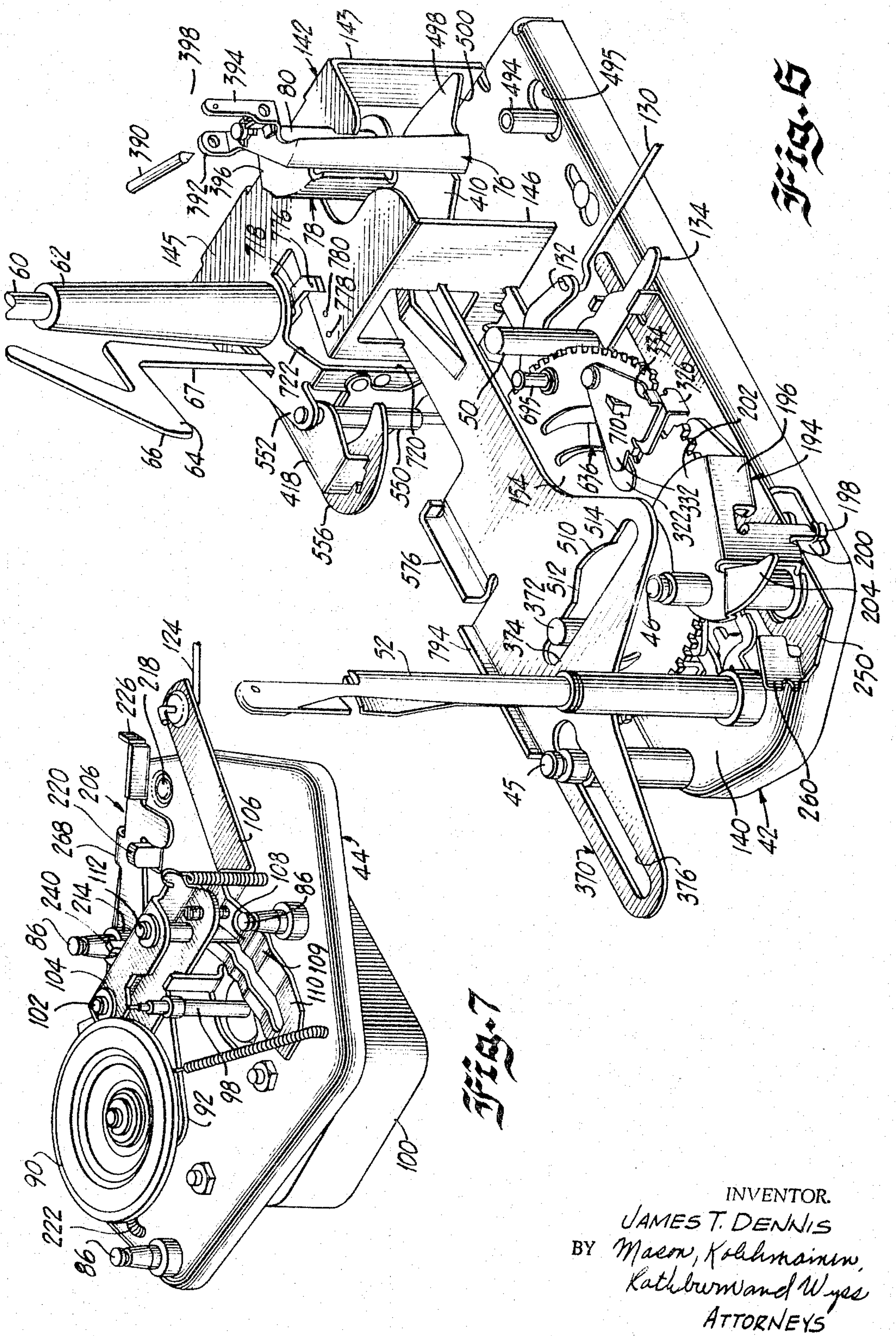
FIG. 6 is a perspective view of the main base subassembly of the record changer of FIG. 1.
FIG. 7 is a perspective view of the motor subassembly of the record changer of FIG. 1.
Figure 8:
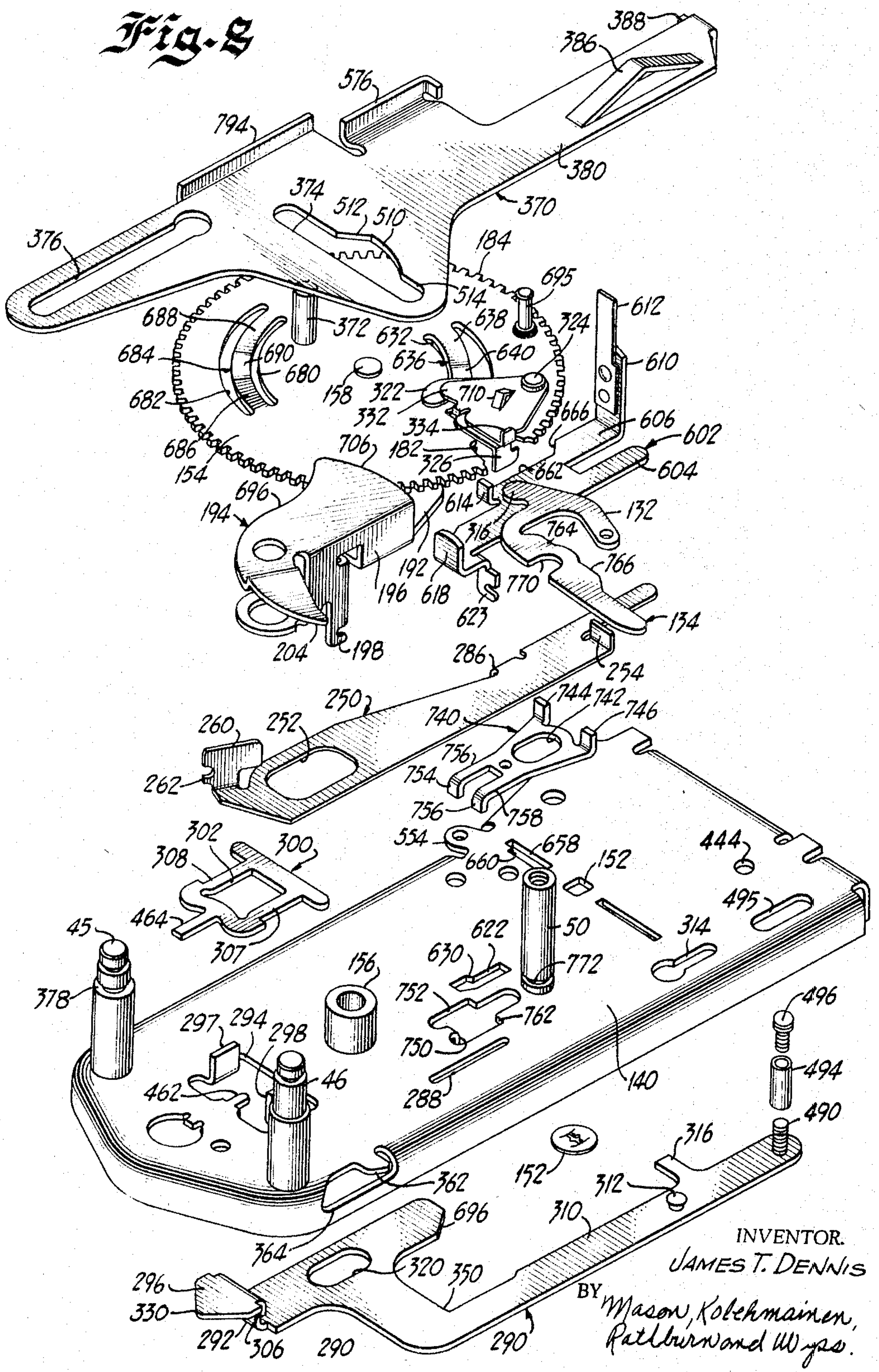
FIG. 8 is an exploded view showing the main cycling mechanism of the main base subassembly of FIG. 6.

The motor subassembly 44 is supported beneath the central depressed portion 43 of the base plate 40 by means of three studs 84, 85 and 86 which are held within rubber grommets 87 by means of the C-washers 88 so that the subassembly 44 is floatingly mounted beneath the base plate portion 43. The subassembly 44 includes an idler wheel 90 which is rotatably mounted on one arm of a bell crank lever 92 and extends through an opening 94 formed in the central base plate portion 43 so that the idler wheel 90 can be moved into engagement with the rim 96 of the turntable 54 and the stepped drive shaft 98 of the motor 100 (FIG. 7) which is mounted to the underside of the subassembly 44. As best illustrated in FIG. 7, the drive shaft 98 is provided with a series of turret steps suitable for driving the turntable at standard speeds of 16⅔ r.p.m., 33⅓ r.p.m., 45 r.p.m. and 78 r.p.m. The bell crank 92 is rotatably mounted on a post 102 (FIG. 1) mounted on one end of a connecting link 104 of U-shaped cross section the vertical position of which is controlled by means of a speed control cam member 106 having a plurality of stepped portions 107, 108, 109 and 110 corresponding to the different turntable speeds. The lever 104 is rotatably mounted on a post 112 secured to the subassembly 44 which is positioned within a clearance slot 114 in the speed cam 106 so that as the cam 106 is reciprocated the idler subassembly including the lever 104, the bell crank 92 and the idler wheel 90 will be moved into alignment with different steps of the drive shaft 98.

In order to change the speed of rotation of the turntable 54 an outer control knob 120 is rotatably mounted on the main base plate 40 and is provided with an arm portion 122 beneath this base plate to which is secured one end of a speed control rod 124. The other end of the rod 124 is connected to the speed control cam 106 so that rotation of the knob 120 is effective to reciprocate the cam 106 and move the idler 90 into position with different steps on the turret 98.

An inner control knob 126 is also rotatably mounted on the base plate 40 and is provided with an arm portion 128 beneath this base plate to which is connected one end of a control rod 130. The other end of the control rod 130 is connected to an offset arm portion 132 of a control lever indicated generally at 134 which is pivotally mounted on the post 50 of the main base assembly 42, as will be described in more detail hereinafter. The control knob 126 is mechanically detented to the intermediate position shown in FIG. 1 by means of the control linkage of the present invention and when this knob is rotated in a counterclockwise direction to an ON-REJECT position the record changer is either turned on, or, if previously turned on a record changing cycle is initiated, as will be described in more detail hereinafter. When the control knob 126 is rotated in a clockwise direction to an OFF position an automatic shutoff cycle is initiated at the end of which cycle the tone arm assembly 70 is positioned on the rest post 72, the motor 100 is turned off and the idler wheel 90 is withdrawn to the neutral position shown in FIG. 1 in which it is not in engagement with either the turntable rim 96 or the drive shaft 98.

Considering now in more detail the main base subassembly 42, this subassembly includes a main base member 140 (FIG. 2) in the form of a flat plate having downturned flange portions 141 and 141*a* along the sides thereof to strengthen the member 140, and a main bracket 142 of generally U-shaped configuration one vertical wall portion 143 of which is connected to the end flange portion 141*b* of the member 140 by means of the screws 144. The other vertical wall portion 146 of the bracket 142 is provided with a series of tongue portions 148, 149 and 150 (FIG. 18) which extend through suitable apertures in the base member 140, the wall 146 of the bracket 142 being secured in place by means of the spring washer 152.

A main cycling gear 153 is rotatably mounted on the base member 40 in such manner that this gear may be bodily elevated during rotation to provide an automatic shutoff action, as will be described in more detail hereinafter. To this end, a bearing 156 is secured to the base member 140 and a gear shaft 158 is positioned within the bearing 156 and is secured to the gear 154 by an suitable means.

In order to mount the spindle 52 on the base member 140, the shank portion 160 of the spindle 52 is provided with a bottom portion 164 of enlarged diameter the bottom end of which is threaded so that it may be clamped to the base member 140 by means of a sheet metal nut 166. The portion 164 provides a horizontal shoulder 168 on which is positioned a ball bearing assembly 170 including an upper member 171. The turntable 54 is secured to a central hub member 174 extending through a clearance opening 175 in the baseplate portion 43, which is provided with a bearing insert 176 which rides on the slightly raised bearing surface 178 of the spindle 52, the bottom end of the hub 174 resting on the upper member 171 of the ball bearing assembly 170 so that this assembly acts as a thrust bearing for the turntable 54. The turntable 54 is retained on the spindle 52 by means of a C-washer which snaps into a groove 179 in the spindle 52. The bottom portion 180 of the hub 174 is provided with teeth 181 which form a driving gear adapted to engage the main cycling gear 154 when a record changing cycle is initiated. More particularly, the gear 154 is provided with a notch 182 in the periphery thereof and this gear is normally held in the position shown in FIG. 3 wherein the teeth 181 ride within the opening formed by the notch 182 and do not engage the teeth 184 of the gear 154.

In order to hold the gear 154 in the position shown in FIG. 3, a pin 186 is mounted on the gear 154 and has a portion of relatively large diameter 188 extending downwardly from the gear 154 which pin is held within a notch 190 formed in the bottom flange portion 192 of a generally U-shaped shutoff lever 194 which is pivotally mounted on the post 46. The vertical side wall 196 (FIG. 4) of the shutoff lever 194 is formed with a downwardly extending lug portion 198 to which one end of a coil spring 200 is connected, the other end of the spring 200 being connected to the side flange 141*a* of the base member 140. The shutoff spring 200 is relatively strong so that it urges the bottom flange 192 of the shutoff lever 194 against the pin 188 with a substantial detent force which must be overcome before the pin 188 can be moved out of the notch 190.

Figure 2:
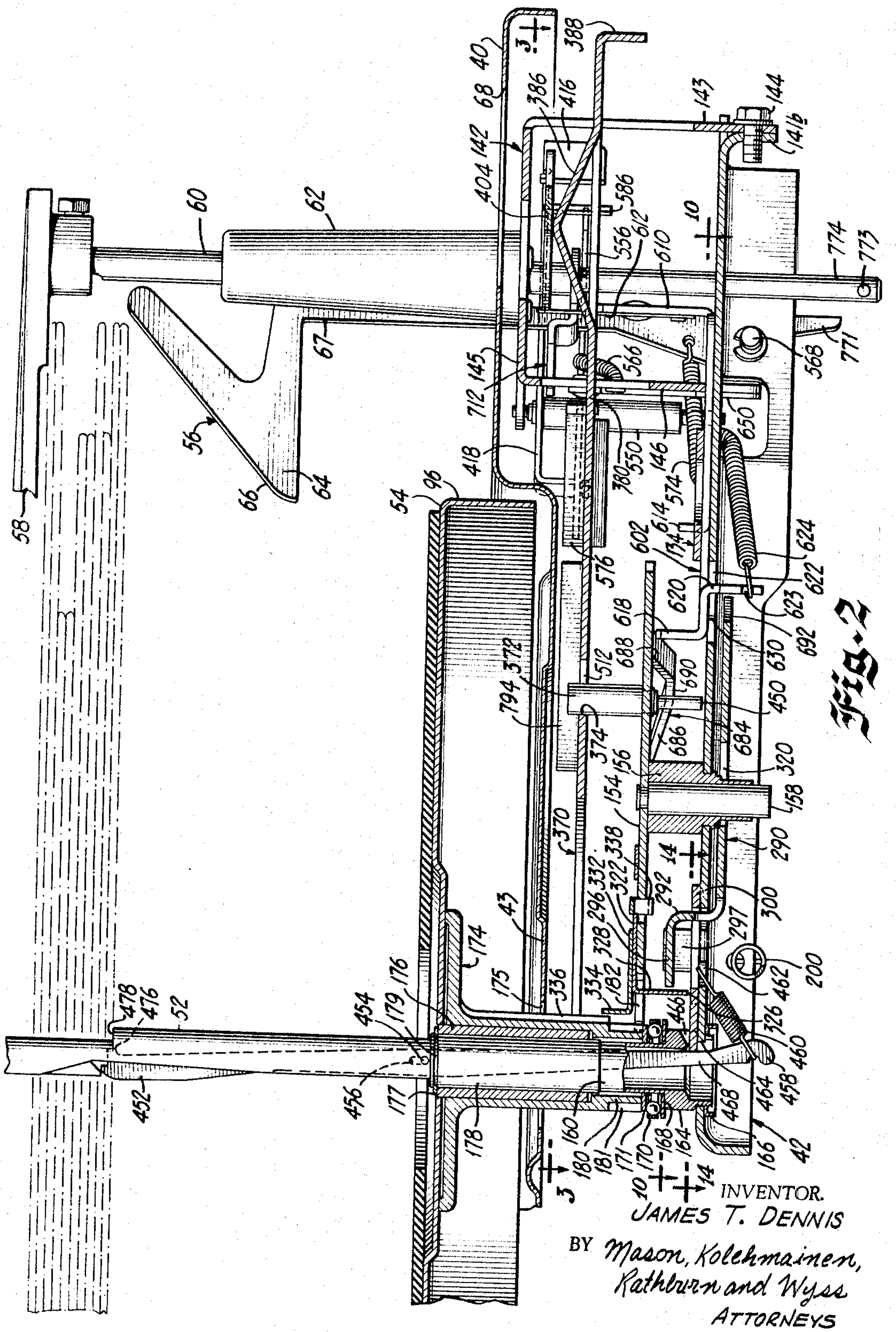
FIG. 2 is a fragmentary side elevational sectional view taken along the lines 2—2 of FIG. 1.

The upper flange portion 202 of the shutoff lever 194 is provided with an offset hook portion 204 which is arranged to engage a shutoff bar 206, which is slidably mounted on the motor subassembly 44, and holds this shutoff bar 206 in a position such that the motor 100 is deenergized and the idler wheel 90 is held in the neutral position shown in FIG. 1. More particularly, the shutoff bar 206 is slidably and pivotally mounted on the base member 208 (FIG. 11) of the motor subassembly 44 by providing a slot 210 in the shutoff bar 206 which is loosely positioned within an undercut portion 212 (FIG. 11) formed in the base portion 214 of the mounting stud 86 which is secured to the base member 208. The motor on-off switch 216 is mounted on the base member 208 by means of the rivets 218 and is provided with a slidably actuated switch lever 220 which may be moved from an off position shown in FIG. 1 to an on position shown in FIG. 11. A spring 222 is connected between an upturned flange 224 on the shutoff bar 206 and the base member 208 so that the bar 206 is normally urged to the left as viewed in FIG. 11. However, when the hook portion 204 is in engagement with an upturned end flange 226 on the shutoff bar 206, this bar is held in the off position shown in FIGS. 1 and 3 due to the fact that the shutoff spring 200, which controls the position of the hook 204, is substantially stronger than the spring 222 which tends to urge the shutoff bar 206 in the opposite direction. As will be described in more detail hereinafter, the spring 200 not only functions to hold the pin 188 within the notch 190 so as to provide a detent means for the main gear 154 in the desired disengaged condition shown in FIG. 3, but in addition the spring 200 provides a force sufficient to hold the shutoff bar 206 in its shutoff position. When the bar 206 is in its shutoff position, a coil spring 230, which is positioned on an offset tongue portion 232 formed in the shutoff bar 206, engages the switch lever 220 and holds this lever in the off position shown in FIG. 1. Accordingly, when the bar 206 is in its shutoff position the motor 100 is denergized.

The shutoff bar 206 also functions to move the idler wheel 90 to the neutral position shown in FIG. 1 as the bar 206 moves to its shutoff position. More particularly, the rear edge portion 234 of an enlarged portion 236 of the slot 210 in the bar 206 is adapted to engage a downturned arm 238 (FIG. 11) formed in one end of the bell crank 92. As the shutoff bar 206 is pulled to the shutoff position shown in FIG. 1 the lever 104 pivots about the pin 112 until it engages an upstanding tongue 240 (FIG. 10) formed in the base member 208. This movement of the lever 104 withdraws the idler wheel 90 from the turntable rim 96. As the bar 206 is moved further towards the shutoff position the bell crank 92 pivots about the pin 102 so that the idler 90 is withdrawn from the turret drive shaft 98. Both of these movements of the idler wheel 90 away from the turntable rim 96 and the drive shaft 98 are accomplished against the force of a spring 242 (FIG. 10) which is connected between the bell crank 92 and the base member 208. Accordingly, it will be seen that when the shutoff bar 206 is held in the shutoff position shown in FIG. 1 the spring 200 is operative to hold the bar 206 in this position by engagement of the hook 204 with the end flange 226 against the force of both of the springs 222 and 242 so that the switch 216 is held in the off position and the idler 90 is held in the desired neutral position.

The shutoff bar 206 is placed in the shutoff position shown in FIG. 1 by movement of the hook portion 204 of the shutoff lever 194 at substantially the end of a shutoff cycle. Such a shutoff cycle may be initiated either by actuation of the control knob 126 to the OFF position or in response to dropping of the balance arm 58 after the last record has been deposited on the turntable 54, as will be described in more detail hereinafter in connection with the operation of a shutoff cycle. If the shutoff bar has been moved to the shutoff position in a preceding shutoff cycle, it is necessary to disengage the end flange 226 from the hook 204 of the shutoff lever 194 before the motor 100 can be energized and the idler 90 moved into engagement with the turntable rim 96 to rotate the same. To accomplish this, there is provided a switch release slide indicated generally at 250 (FIG. 8) which is slidably mounted on the base member 140 of the main base subassembly 42. The switch release slide 250 is in the form of an elongated flat member having an enlarged opening 252 positioned around the post 46 and having an upturned flange 254 at the rear end thereof which is urged into engagement with the edge 256 of the control lever 134 by means of a spring 258 which is connected between the forward end of the switch release slide 250 and the base member 140. More particularly, the slide 250 is provided with an upstanding flange 260 at the forward end thereof and the flange 260 has a notch in the forward edge thereof defining a tongue 262 (FIG. 11) over which one end of the spring 258 is hooked. The control lever 134 is normally biased to the neutral position shown in FIG. 3 by means to be described hereinafter, so that the switch release slide 250 is normally held in the position shown in FIG. 3 by the spring 258.

Figures 10, 13:
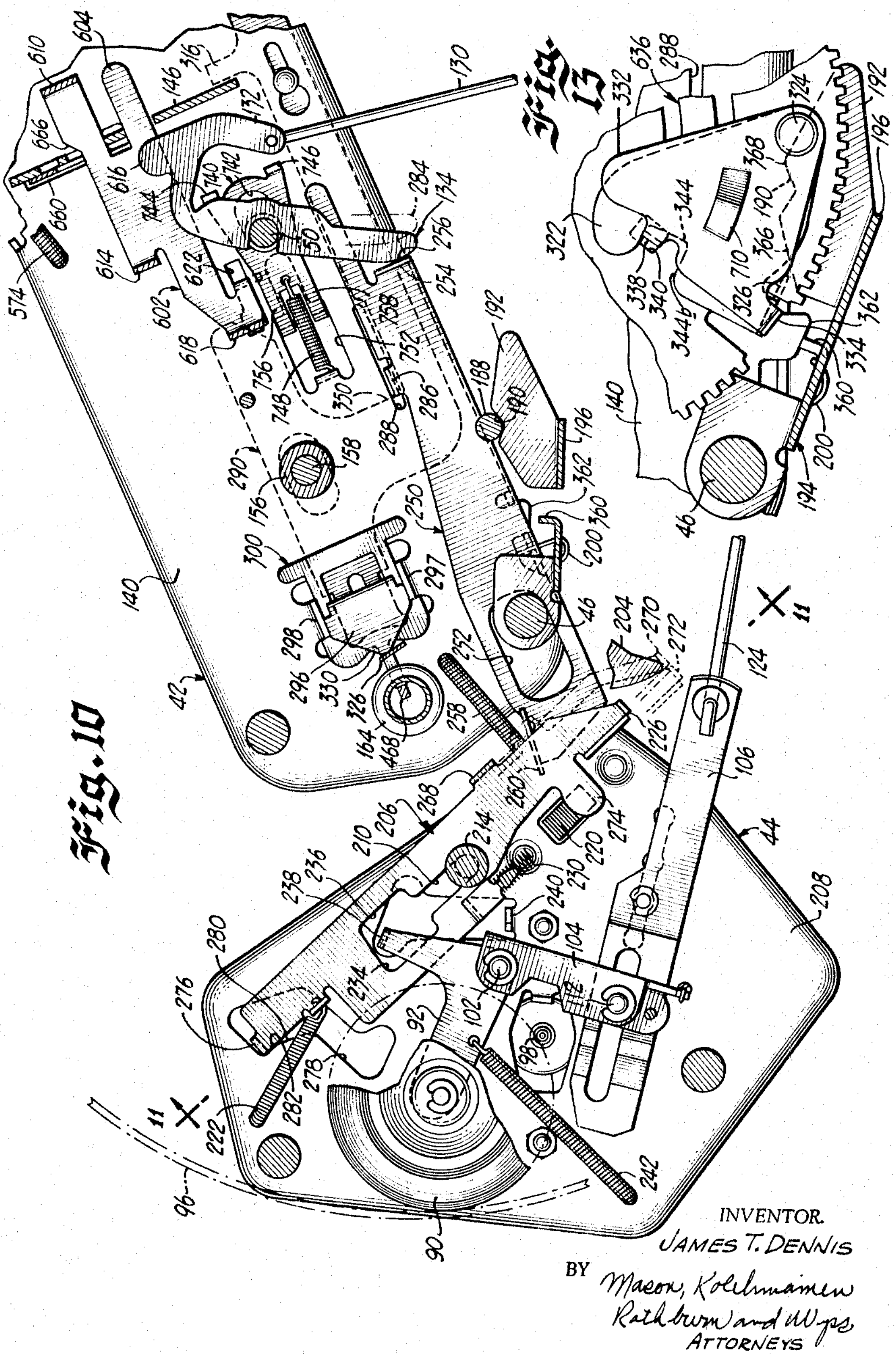
FIG. 10 is a fragmentary plan view of the main base and motor subassemblies of the changer of FIG. 1 taken along the lines 10—10 of FIG. 2 and with the control linkage in the "on" position.
FIG. 13 is a fragmentary plan view of a portion of FIG. 3 showing the manner in which the velocity trip mechanism is reset.
Figures 11, 23, 29:
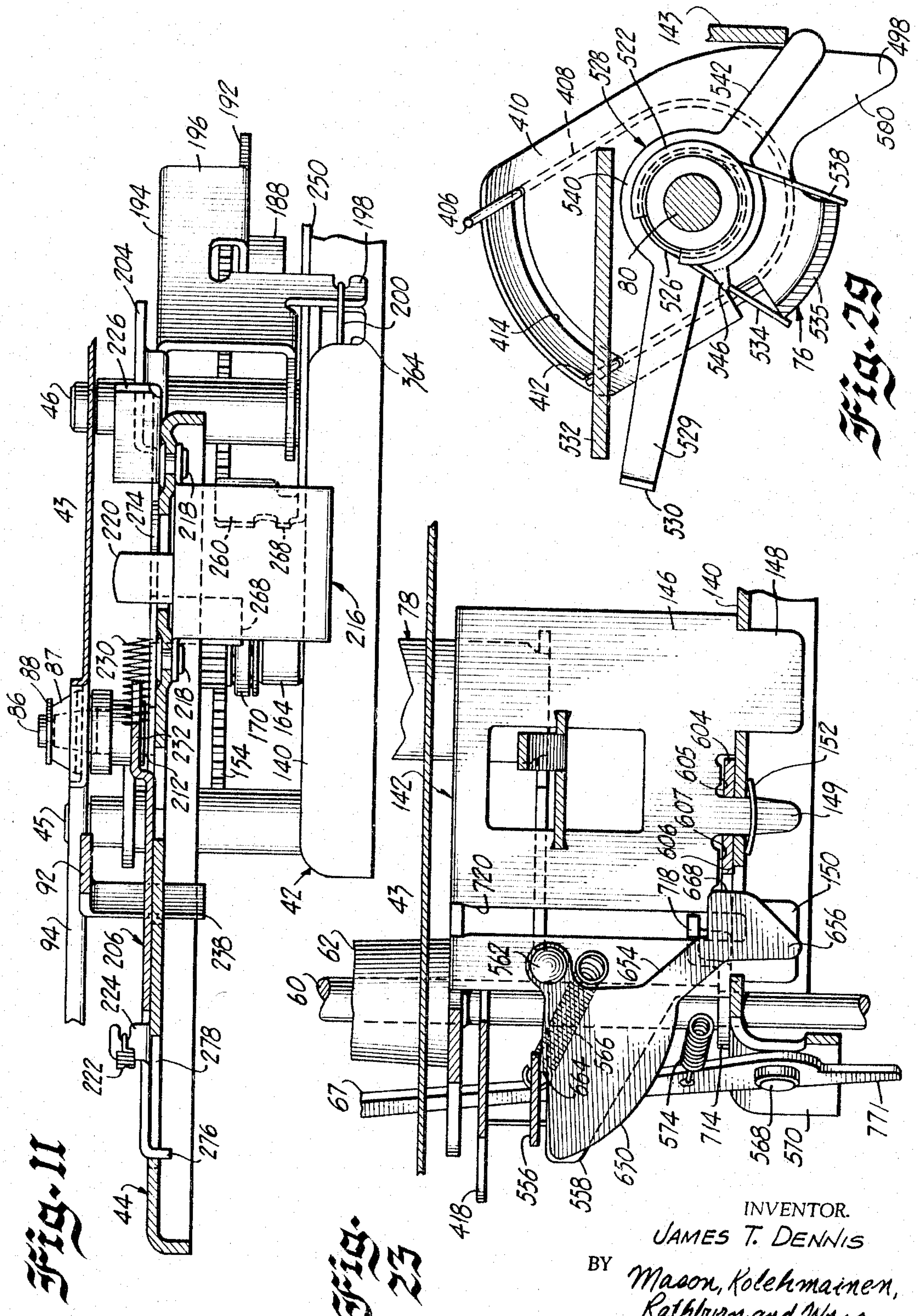
FIG. 11 is a sectional view taken along the lines 11—11 of FIG. 10.
FIG. 23 is a fragmentary, sectional, side elevational view similar to FIG. 18 but showing the actuation of the last record shutoff mechanism in response to movement of the balance arm.
FIG. 29 is a fragmentary plan view of FIG. 27.

When the control knob 126 is rotated in the counterclockwise direction as viewed in FIG. 1 the control lever 134 is pivoted to the position shown in FIG. 10 and during this pivotal movement the flange 260 of the switch release slide 250 is moved toward the shutoff bar 206. The shutoff bar 206 is provided with a downturned flange 268 (FIG. 11) which is positioned in the path of the flange 260 on the slide 250 when the hook 204 of the shutoff lever 194 engages the end flange 226 of the bar 206, as shown in FIG. 3. When the control lever 134 is pivoted to move the slide 250, the flange 260 engages the flange 268 on the shutoff bar 206 and moves this bar so that it pivots about the bushing 214 and moves from the position shown in dotted lines at 270 in FIG. 10 to the position shown in dotted lines at 272 in this figure. When the shutoff bar is moved to the position 272 the end flange 226 of this bar is moved beyond the edge of the hook 204 so that the springs 222 and 242 are effective to move the shutoff bar 206 to the on position shown in FIG. 11 and in full lines in FIG. 10. As this occurs, a projecting arm portion 274 on the shutoff bar 206 engages the switch lever 220 and moves it to the on position shown in FIG. 10 while at the same time the pressure of the spring 230 is removed from the other side of the switch lever 220. The motor 100 is thus turned on so that the drive shaft 98 rotates. As best illustrated in FIG. 11, the top edge of the flange 260 on the slide 250 is lower than the bottom edge of the base member 208 of the motor subassembly 44. Accordingly, when the bar 206 has been moved to the on position the flange 268 is removed from the path of the flange 260 so that the slide 250 may be moved an additional amount in the same direction to initiate an automatic record changing cycle, the flange 260 during such movement passing under the edge of the base member 208.

As the shutoff bar 206 is moved to the on position shown in FIG. 10, the bell crank 92 is rotated by the spring 242 so as to bring the idler wheel 90 into engagement with both the turntable rim 96 and the drive shaft 98. The shutoff bar 206 is provided with a downturned flange 276 (FIG. 11) at the end thereof which is positioned within an irregularly shaped opening 278 (FIG. 10) formed in the base member 208 of the motor subassembly 44. When the shutoff bar 206 is released from the tip of the hook 204 in the manner described above, the flange 276 strikes an inclined edge portion 280 of the opening 278 and is moved rearwardly by the springs 222 and 242 until the flange 276 is in engagement with an edge 282 of the opening 278. Since the spring 222 is secured to the base member 208 at an angle to the surface 282 the shutoff bar 206 is accurately indexed against the edge 282 with respect to pivotal movement about the bushing 214 when the shutoff bar is in the on position shown in FIG. 10. Also, the spring 222 urges the shutoff bar 206 rearwardly until the forward edge of the slot 210 is in engagement with the recess 212 on the bushing 214 so that the shutoff bar 206 is accurately registered in the on position and may be picked up by movement of the hook 204 at substantially the end of a shutoff cycle, as will be described in more detail hereinafter.

In the above described operation wherein the switch release slide 250 is moved so that the flange 260 thereof engages the flange 260 on the shutoff bar 206 and pushes the end flange 226 off of the end of the hook 204, it will be noted that only a relatively small movement of the switch control slide 250 is necessary to accomplish this result, this movement being equal to the distance necessary to cause the flange 260 to engage the flange 268 plus the additional movement necessary to move the end flange 226 off of the tip of the hook 204. Accordingly, if the control lever 134 is not pivoted to the full forward position shown in full lines in FIG. 10 but instead is pivoted to an intermediate position shown in dotted lines at 284 in FIG. 10, in which position the slide has been moved enough to disengage the shutoff bar 206 from the hook 204, the motor 100 will be energized and the turntable 54 will rotate without initiating a record changing cycle. This intermediate position may be termed a manual playing position and is achieved by rotating the control knob 126 to a position intermediate the neutral position shown in FIG. 1 and the full ON-REJECT position of the lever 134 shown in FIG. 10. However, if it is desired to turn the machine on and initiate a record changing cycle, or in the alternative, to initiate a record changing cycle if the machine is already turned on, an automatic tripping mechanism is provided which is responsive to movement of the control lever 134 to the full forward position shown in full lines in FIG. 10 to initiate a record changing cycle.

Figures 14, 17:
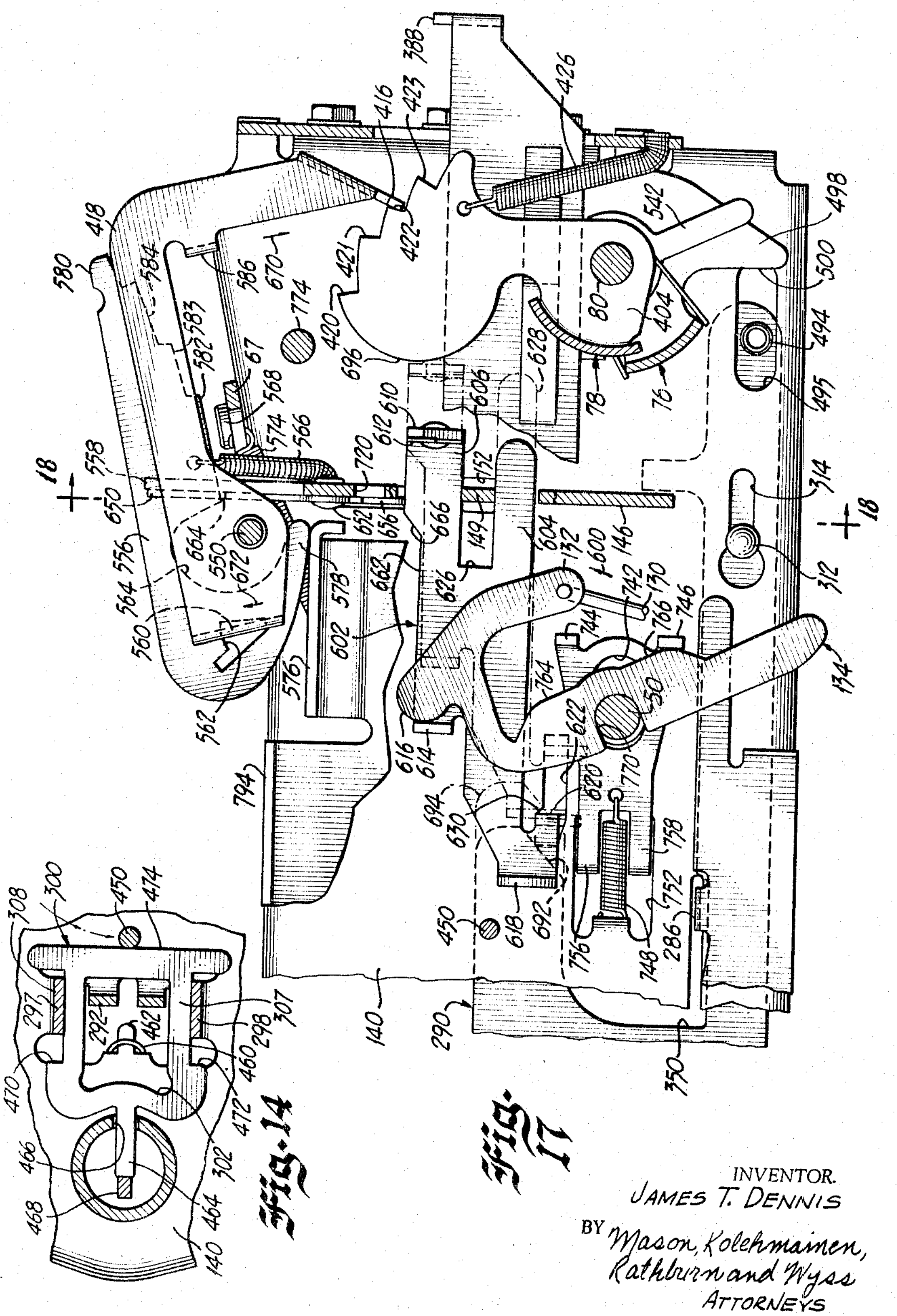
FIG. 14 is a fragmentary sectional plan view taken along the lines 14—14 of FIG. 2 with the spindle crank in actuated position.
FIG. 17 is a fragmentary plan view of a portion of FIG. 3 with a portion of the cycling slide broken away and showing the control linkage in the off position.

More particularly, the switch release slide 250 is provided with a downturned flange 286 (FIG. 10) which extends through a slot 288 formed in the main base member 240. A velocity trip arm indicated generally at 290 (FIG. 8) is loosely supported for sliding movement beneath the base member 140 and is provided with an upturned portion 292 which extends through an opening 294 in the base member 140 and is provided with an offset head portion 296 positioned between the gear 154 and the base member 140 and guided for sliding movement by means of a pair of vertically extending ears 297 and 298 which are struck up out of the base member 140. A spindle actuating crank, indicated generally at 300, is slidably mounted on the base member 140 and straddles the opening 294 therein, the crank 300 being provided with a clearance opening 302 therein through which the vertically extending portion 292 of the velocity trip arm 290 extends as best illustrated in FIG. 14. Also, as most clearly illustrated in FIG. 4, the portion 292 of the velocity trip 290 is provided with a narrower bottom portion 304 which defines a pair of shoulders 305 and 306 intermediate the height of the portion 292 and the shoulders 305 and 306 ride on the side bars 307 and 308 of the spindle crank 300. The trip arm 290 is thus supported at its forward end for sliding movement with a minimum amount of friction.

The trip arm 290 is also provided with an elongated rearwardly extending portion 310 (FIG. 8) having a headed rivet 312 secured thereto the head portion of which rides along the sides of a slot 314 (FIG. 3) in the base member 140. The slot 314 is preferably made in keyhole form to permit ready assembly of the trip arm 290 on the base member 140 before the main bracket 142 is mounted thereon. The rearwardly extending portion 310 of the velocity trip arm 290 is provided with a transverse arm portion 316 which is adapted to engage the tongue portion 148 (FIG. 18) of the bracket side wall 146 after the bracket 142 has been assembled to the base member 140 so that the head of the rivet 312 cannot reach the enlarged portion of the keyhole slot 314 once the bracket 142 has been assembled to the base member 140. The rear end of the velocity trip arm 290 is thus loosely supported for sliding movement with a minimum amount of friction by engagement of the underside of the head portion of the rivet 312 with the sides of the slot 314. The trip arm 290 is also provided with a clearance opening 320 so that the arm 290 may be slid back and forth without engaging the bearing 156 of the main gear 154.

The tripping mechanism includes a pair of tripping plates which are pivotally mounted on the main gear 154. More particularly, a first tripping plate 322 rests on the main gear 154 and is loosely mounted for limited pivotal movement about a headed stud 324 also secured to the main gear 154. The plate 322 is provided with a downturned flange portion 326 positioned beneath the gear 154 and connected to the plate 322 by means of a narrower portion 328 which extends through the notch 182 in the main gear 154. The flange 326 is positioned to be struck by the pointed tip 330 of the velocity trip arm 290 when this arm is moved toward the spindle, either by actuation of the control linkage or by movement of the tone arm during the playing cycle, as will be described in more detail hereinafter.

A second tripping plate 332 rests upon the tripping plate 322 and is loosely supported for a limited pivotal movement about the stud 324. The plate 332 is provided with an upturned flange 334 which is adapted to be struck by a vertically extending flange 336 provided on the hub 174 when the plate 332 is pivoted forwardly by an amount sufficient to bring the flange 334 into the path of the flange 336. The plate 332 is also provided with a downturned flange 338 which extends through a rectangular opening 340 in the main gear 154, and an offset end portion 342 which is positioned beneath the main gear 154. The tripping plate 322 is provided with a notch 344 in the edge thereof through which the transverse flange 338 on the upper tripping plate 332 extends.

Considering now the manner in which the above described tripping mechanism is actuated in response to movement of the control lever 134 to the full ON-REJECT position shown in FIG. 10, when the lever 134 is moved to this position the switch release slide 250 is moved forward to the position shown in FIG. 10 and as this movement occurs the downturned flange 286 on the slide 250 engages the edge portion 350 (FIG. 3) of the velocity trip arm 290 and moves the trip arm 290 forwardly so that the tip 330 thereof engages the downturned flange 326 on the tripping plate 322. As the arm 290 continues to move in this direction the plate 322 is moved closer to the spindle by pivotal movement about the stud 324. The upper plae 332, which is resting on the bottom plate 322, rides with the bottom plate so that the flange 334 will shortly be brought into the path of the forward edge 336*a* of the flange 336. If the forward edge 336*a* of the flange 336 strikes the edge 334*a* of the upturned flange 334 solidly a force will be transmitted through the upper plate 332 to the stud 324 so that the main gear 154 is rotated by an amount sufficient to bring the teeth 184 thereof into engagement with the driving gear teeth 181 on the turntable hub 174, so that rotation of the main gear 154 is initiated.

It is possible that the flange 334 may be struck a glancing blow by the flange edge 336a with the result that the upper plate 332 will be knocked back over the bottom plate 322 to a position outside the path of the flange 336 without initiating movement of the gear 154. Such action does not take place when the velocity trip arm 290 is moved by the tone arm during the playing cycle to provide a velocity trip action, but when the tripping mechanism is actuated manually by movement of the control lever 134 to the on position shown in FIG. 10 the forward movement of the trip arm 290 might be timed so that the upper tripping plate 332 would be knocked out of the path of the flange 336. In order to provide a positive tripping action in the event the above situation occurs, the tripping plates 322 and 332 are arranged so that upon continued forward movement of the trip arm 290 after the tip 330 has engaged the flange 326, the bottom plate 322 will be moved an amount sufficient that the edge 344a of the notch 344 in the plate 322 will engage the edge of the flange portion 338 on the upper plate 332. Accordingly, a positive connection is then provided between the plate 322 and the plate 332 so that as the trip arm 290 is moved further forward both of the plates 322 and 332 are pivoted about the stud 324, thus insuring that the flange 334 will be brought into the path of the flange 336 and will be held in this path until the gear 154 is moved into engagement with the driving teeth 181. This extreme forward position of the trip arm 290 is shown in FIG. 12 wherein it is seen that the edge 344a of the notch 344 in the bottom plate 322 has engaged the portion 338 on the upper plate 332 and has moved the upper plate until the portion 338 strikes the opposite side of the opening 340 in the gear 154. In this position the flange 334 is positioned to be engaged positively by the flange portion 336a so that rotation of the gear 154 is positively insured. The gear 154 continues to rotate for substantially one revolution until the notch 182 therein has been brought into a position opposite the driving teeth 181 at which point the gear 154 again becomes disengaged to terminate the record changing cycle.

After the tripping mechanism has been actuated in the manner described above to initiate a record changing cycle, it is necessary to reset the tripping plates 322 and 332 to the initial position shown in FIG. 3 so that they will be ready for actuation either in response to tone arm movement at the end of a playing cycle or in response to actuation of the control member 134. In accordance with a feature of the invention the plates 322 and 332 are reset by means of the spring biased shutoff lever 194 as the gear 154 is rotated. More particularly, as soon as rotation of the gear 154 is initiated the detent pin 188 is moved out of the notch portion 190 in the flange 192 of the shut off lever 194. When this occurs the shutoff lever 194 is pivoted by the spring 200 until an inturned vertically extending flange 360 formed in the side wall 196 of the lever 194 engages a horizontally projecting stop 362 (FIG. 10) formed in the main base member 140, the stop 362 being conveniently formed by utilizing a portion of the material of the base member 140 which is cut away to provide a clearance opening 364 (FIG. 8) for movement of the spring 200 as the shutoff lever 194 is pivoted to various positions.

The stop 362 is arranged so that when the flange 360 is urged into engagement therewith, the flange portion 192 of the shutoff lever 194 is positioned in the path of the downturned flange 326 on the bottom tripping plate 322. Furthermore, the position of the flange 192 for resetting the plates 322 and 332 is positively assured by means of the relatively strong spring 200 which biases the flange 360 against the stop 362. Accordingly, as the gear 154 is rotated the downturned flange 326 engages the inclined edge 366 (FIG. 13) of the flange 192 so that the bottom plate 322 is pivoted about the stud 324 as the gear 154 rotates due to the camming action of the edge 366 on the downwardly extending flange 326. As the bottom plate 322 is thus pivoted about the stud 324 the edge 344b (FIG. 13) of the notch 344 in the bottom plate 322 engages the downturned flange portion 338 on the upper plate 332 so that the upper plate 332 is also pivoted until the flange 338 engages the side of the opening 340 in the main gear 154 at which point both of the plates 322 and 332 have been cammed back to their initial position shown in FIG. 3. It will be seen that when the flange 338 engages the side of the opening 340 in the main gear 154 further pivotal movement of the plates 322 and 332 is prevented. Preferably the shoulder 368 (FIG. 13) on the flange 192 is so positioned that the flange 326 will engage this shoulder even after the plates 322 and 332 have been set to their initial positions with the result that as the flange 326 rides over the shoulder 368 the shutoff lever 194 is pivoted away from the stop 362 slightly against the force of the spring 200, thus insuring that the trip plates 322 and 332 have been set to their required initial positions. Furthermore, by utilizing the spring biased shutoff lever as a refence in resetting the plates 322 and 332 jamming is prevented since the spring 200 can give once these plates have been reset to their initial position.

Movement of the gear 154 during the record changing cycle is employed to reciprocate a main cycling slide indicated generally at 370 (FIG. 3) and movement of the slide 370 is employed to control movement of the tone arm 70 during the record changing cycle so that the tone arm is lifted off of a record on the turntable, is moved outwardly to a position adjacent the rest post 72, and is then moved inwardly to a correctly indexed position corresponding to the diameter of the record released during the record changing cycle and is lowered onto the surface of this record to initiate the playing cycle. To accomplish this reciprocating movement of the slide 370, a driving pin 372, which is secured to the main gear 154 and extends upwardly therefrom is positioned within a transverse slot 374 in the slide 370. The forward end of the cycling slide 370 is mounted for reciprocating movement on the base member 140 by means of a slot 376 the edges of which ride on a groove 378 formed in the main mounting stud 45. The rearward portion 380 of the slide 370 is slidably positioned in a pair of notches 382 and 383 (FIG. 18) formed in the vertical edges of an opening 384 in the side wall 146 of the main bracket 142.

In order to control vertical movement of the tone arm 70, the slide portion 380 is provided with an inclined ramp portion 386 which is struck up out of the main plane of the slide 370. Also, a downturned end flange 388 on the end of the slide is employed to control inward and outward movement of the tone arm during the record changing cycle. More particularly, the U-shaped tone arm bracket 76 is pivotally supported on the end of the tone arm pivot pin 80 by means of a transverse pin 390 (FIG. 6) which rests on the rounded upper end of the pivot pin 80 and extends between a pair of upstanding ears 392 and 394 formed in the upper flange of the bracket 76. The tone arm indexing bracket 78 is pivotally mounted on the pin 80 and is also arranged for vertical sliding movement along this pin. The tone arm assembly 70 is mounted for pivotal movement about the pin 390 so that the tone arm can be raised and lowered. Thus, the upper flange 396 of the tone arm indexing bracket 78 is provided with an offset tongue portion 398 which is positioned within a slot 399 in the depending rear flange 400 of the tone arm pivot bracket 402 which is pivotally mounted on the ends of the pin 390 and connected to the tone arm assembly 70.

Figure 27:
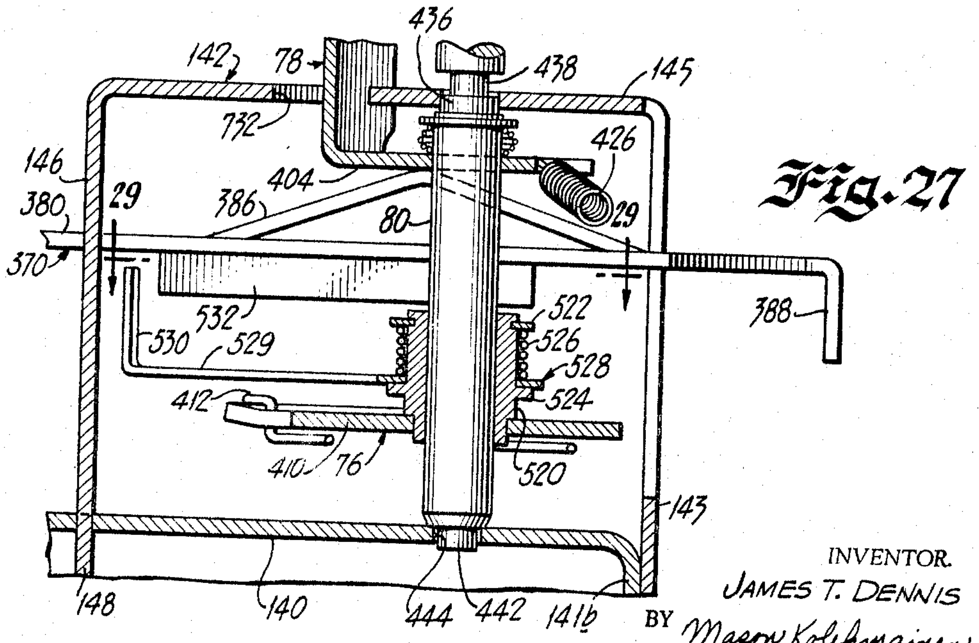
FIG. 27 is a sectional view taken along the lines 27—27 of FIG. 3.

The bottom flange portion 404 of the tone arm indexing bracket 78 is arranged to ride on the inclined surface 386 of the slide 370 so that when the slide is moved forwardly at the beginning of the record changing cycle the tone arm indexing bracket 78 is moved downwardly from the position shown in FIG. 27. This downward movement of the bracket 78 causes the tongue portion 398 thereof to engage the bottom edge of the slot 399 in the flange 400 of the bracket 402 and exert a downward force on the rear of the tone arm assembly so that the stylus is lifted off of the record. As the slide 370 continues to move forwardly during the first half of the record changing cycle the flange 388 engages the offset end portion 406 (FIG. 28) of a U-shaped safety spring 408 which is mounted on the underside of the bottom flange 410 of the tone arm bracket 76, the other end 412 of the spring 408 being positioned in the other end of a slot 414 in the bottom flange 410, and pivots the tone arm bracket 76 about the pivot post 80 so that the tone arm assembly 70 is moved outwardly beyond the edge of the largest record. As the tone arm bracket 76 is thus rotated, the indexing bracket 76 remains fixed and the tongue 398 rides on the bottom edge of the slot 399 until a notch 415 (FIG. 1A) in the slot 399 is encountered into which the tongue 398 drops and thereafter the tone arm indexing bracket 78 rotates with the tone arm bracket 76 until the tone arm is lowered onto a record.

The bottom flange 404 of the indexing bracket 78 is provided with a series of indexing steps which are adapted to be engaged by the tip portion 416 of an index pawl 418 the position of which is set in accordance with movement of the indexing member 56 which is struck by the edge of a record as it is released to the turntable. Thus, a seven inch indexing step 420 is provided on the flange 404, a ten inch indexing step 421, a twelve inch indexing step 422 and a rest position indexing step 423, it being understood that the tone arm indexing bracket 78 is shown in the rest position in FIG. 3 in which position the index pawl 418 is in engagement with the rest position step 423 in which position the tone arm assembly 70 is positioned on the rest post 72. The tone arm indexing bracket 78 is spring biased to hold any one of the steps 420–423 in engagement with the pawl 418 by means of a spring 426 which is connected between the bottom flange 404 of the bracket 78 and the side wall 143 of the main bracket 142.

The functioning and operation of the tone arm bracket 76 and the tone arm indexing bracket 78, in conjunction with the index pawl 418 is generally similar to that described in my copending application Ser. No. 168,305, filed Jan. 16, 1962, now patent No. 3,254,896, which is a continuation of my earlier application Ser. No. 752,969, filed Aug. 4, 1958, now abandoned, and hence a detailed description of the functioning of this portion of the changer is considered unnecessary herein. However, in accordance with a feature of the present invention, the tone arm mounting and indexing assembly comprising the pivot pin 80, the tone arm bracket 76, the tone arm indexing bracket 78, and parts carried by these members, is assembled as a separate subassembly which can then be mounted on the main bracket 142. More particularly, the top wall 145 of the main bracket 142 is provided with a large opening 432 (FIG. 9) therein which is adapted to receive the bight portions of the brackets 76 and 78 and a mounting hole 434 is provided to receive a shoulder 436 (FIG. 27) formed on the pivot pin 80. The pin 80 is provided with a portion 438 of reduced cross section immediately above the shoulder 436 which is sufficiently narrow to move through the restricted mouth 440 of the opening 434. Also, the pivot pin 80 is provided with a bottom portion 442 of reduced cross section which is adapted to fit into a corresponding opening 444 in the base member 140. Accordingly, the tone arm subassembly may be positioned in place before the main bracket 142 is secured to the base plate 140 by moving the portion 438 through the mouth 440, positioning the end portion 442 of the pivot pin in the opening 444 and then moving the main bracket downwardly so that the shoulder 436 is positioned in the aperture 434 in the top wall 145. The bracket 142 may then be secured in place by tightening the screws 144.

Figures 15, 19, 20:
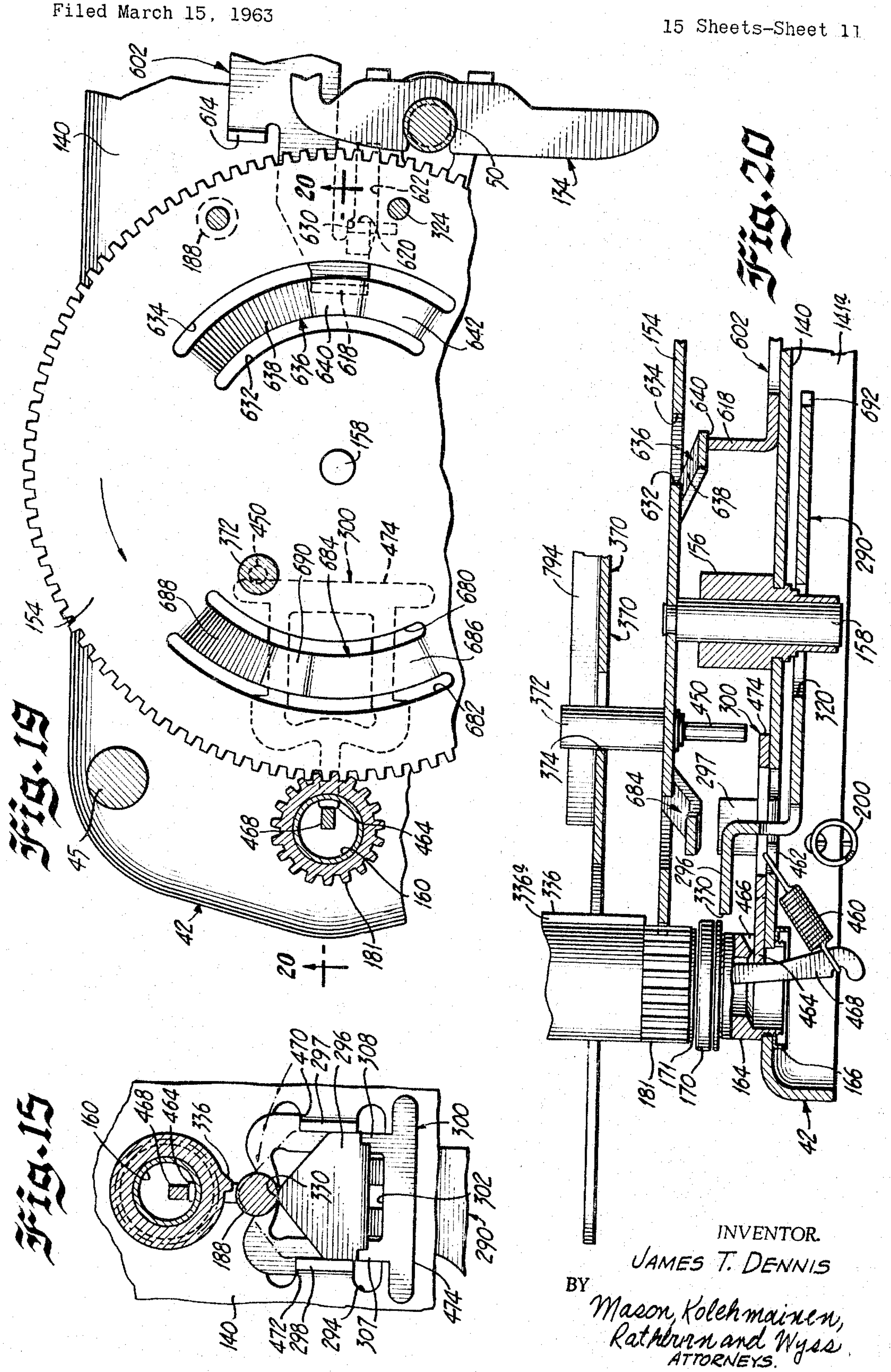
FIG. 15 is a fragmentary sectional plan view taken along the lines 15—15 of FIG. 4 and illustrating the manner in which the velocity trip arm is reset.
FIG. 19 is a fragmentary plan view of a portion of FIG. 3 with the cycling slide and tripping mechanism removed and showing the manner in which the main gear is elevated so that the spindle actuating crank of the mechanism is not actuated upon last record shutoff.
FIG. 20 is a sectional view taken along the lines 20—20 of FIG. 19.
Figure 19:
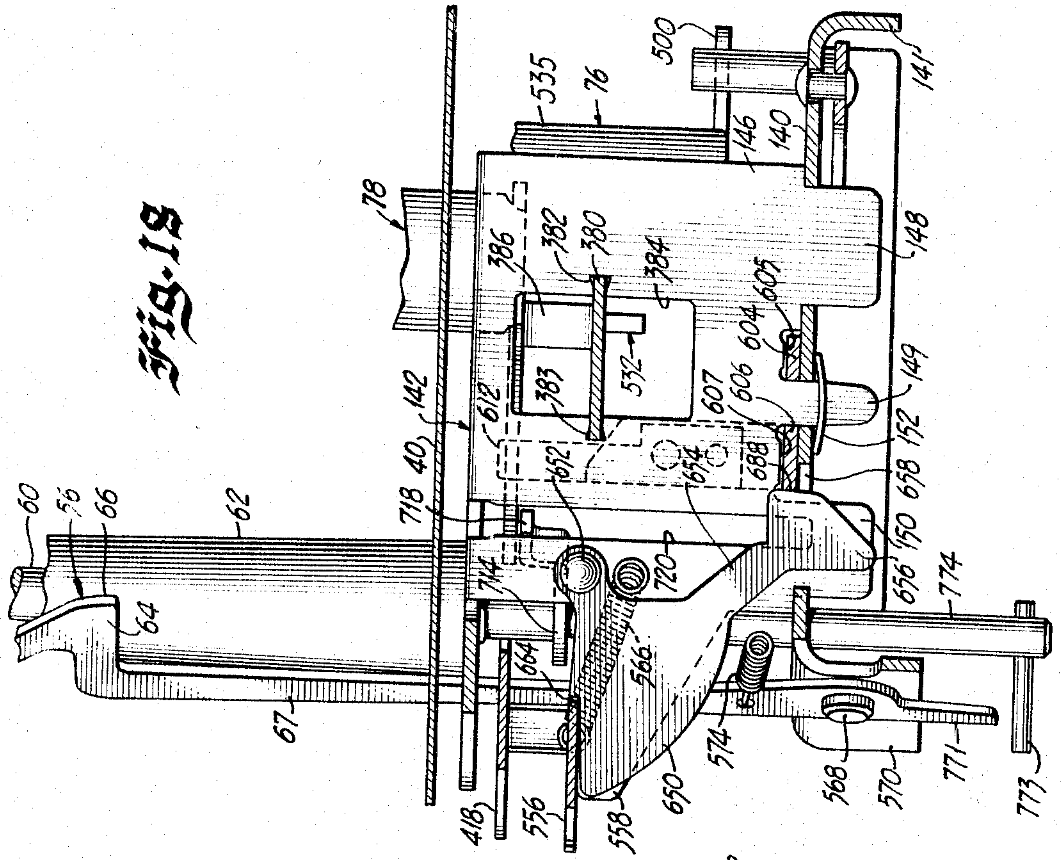
Figure 16:
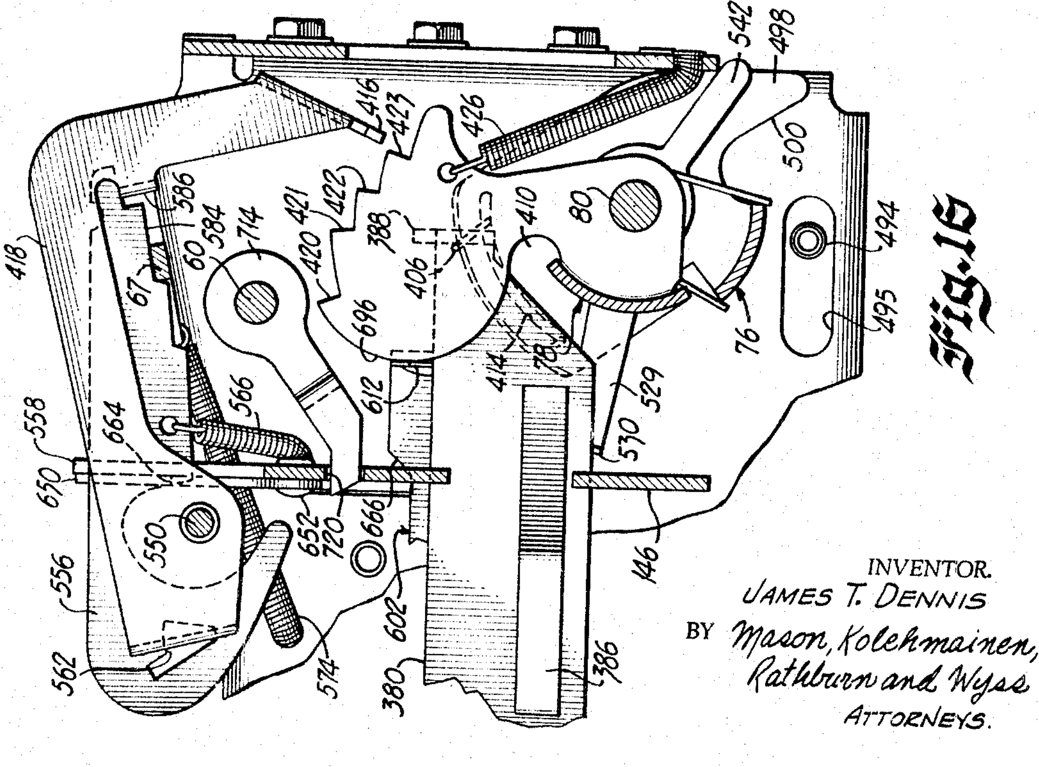
FIG. 16 is a fragmentary plan view of the tone arm indexing portion of FIG. 3 shown in the twelve inch record indexing position.

Considering now the manner in which the spindle 52 is actuated slightly before the midpoint of the record changing cycle, the pin 372 which is mounted on the gear 154 is provided with a portion 450 of reduced diameter which extends below the gear 154 and acts as a spindle crank actuating pin. The spindle 52 is hollow and is open at the bottom so that a record actuating blade 452 can be pivotally mounted in the spindle 52. To this end a transverse pin 454 is positioned within a slot 456 in the blade 452. The bottom end of the blade 452 is provided with a hook portion 458 to which is connected a spring 460 the other end of which is hooked over a projecting tongue 462 (FIG. 14) provided on the base member 140 when the opening 294 is formed therein. As discussed heretofore, the spindle actuating crank 300 straddles the opening 294 in the base member 140 and is positioned between the upstanding ears 297 and 298 provided therein. The crank 300 is provided with a forwardly projecting tongue portion 464 which extends through a slot 466 formed in the base portion 164 of the spindle 52 so that the tongue portion engages the bottom portion 468 of the blade 452. The spring 460 normally holds the blade 452 in the position shown in FIG. 2, in which position a pair of shoulders 470 and 472 provided on the crank 300 engage the ears 297 and 298 as shown in FIG. 15. Also, the spring 460 provides an upward component of force so that the bottom of the slot 456 in the blade 452 is held against the pivot pin 454.

When the main gear 154 has rotated almost one-half revolution the pin 450 depending therefrom engages the edge 474 of the spindle crank 300 and moves this crank toward the spindle to the position shown in FIG. 14 against the force of the biasing spring 460. This causes the blade 452 to pivot about the pin 454 so that the upper edge 476 of the blade 452 engages the bottommost record and moves it off of the shelf 478 of the spindle 52. When this occurs the remaining records of the stack press downwardly on the edge 476 so that this blade moves downwardly by virtue of the slot 456 and against the force of the spring 460. As the pin 450 continues to move during the record changing cycle the crank 300 is returned to the initial position shown in FIG. 15 by the force of the spring 460 which force also causes the blade 452 to be raised upwardly to the position shown in FIG. 2 after the edge 476 has been moved back sufficiently to clear the record stack, as will be readily understood by those skilled in the art.

While the tripping plates 322 and 332 are reset in the manner described heretofore when the flange 326 engages the shoulder 368 on the flange 192 of the shutoff lever 194, it is also necessary to reset the velocity trip arm 290 since it has been moved forwardly in the manner described heretofore to initiate the record changing cycle. In accordance with a further feature of the invention, the velocity trip arm 290 is reset when the gear 154 has rotated approximately three-fourths of one revolution. More particularly, when the gear 154 is rotated about three-fourths of one revolution the detent pin 188, which extends beneath the gear 154, has been moved to the position shown in FIG. 15 and as the detent pin 188 moves to this position it engages the tip portion 330 of the velocity trip arm 290 and moves this arm back to the rest position of this arm shown in FIG. 3. In this connection it will be understood that the head portion 296 of the trip arm 290 is slidably positioned on the side bars 307 and 308 of the crank 300 so that the trip arm 290 may be readily moved to reset it to its initial position. It will also be seen from FIG. 4 that the detent pin 188, while depending sufficiently to engage the head portion 296 of the trip arm 290, passes over the spindle crank 300 and does not engage this member. Accordingly, the crank 300 remains in its non-actuated position under the bias of the spring 460 although the trip arm 290 may be moved back and forth along the side bars of this crank. Since the crank 300 is a simple flat plate member it may be made extremely smooth, by a suitable tumbling operation or the like, so that the velocity trip arm 290 may slide along the side bars of the crank 300 with very little friction.

Up to this point the operation of the trip arm 290 has been considered only as occurring in response to actuation of the control lever 134 by rotation of the control knob 126 to the ON-REJECT position. However, the trip arm 290 is also arranged to function as an automatic tripping member which is responsive to the increased velocity of inward movement of the tone arm assembly 70 when the stylus of this assembly engages the runout groove of a record on the turntable 54. More particularly, a coil spring 490 (FIG. 8) is positioned in an opening in the rear end of the extension 310 of the arm 290, the bottom portion of this spring being hooked around a tongue 492 formed in the end of the extension 310. A tubular sleeve 494 is positioned around the spring 490 on the extension 310 and extends through a clearance opening 495 in the base member 140. The spring 490 is provided with an enlarged head portion 496 which engages the upper end of the sleeve 494 so that this sleeve is normally held in a vertical position on the upper surface of the portion 310. The sleeve 494 is arranged to be engaged by an arm portion 498 (FIG. 9) formed in the bottom flange 410 of the tone arm bracket 76. Thus, as the tone arm is moved inwardly over the record, the edge 500 of the arm portion 498 engages the side of the sleeve 494 and moves the trip arm 290 toward the spindle 52 so that the tip 330 thereof is moved into engagement with the depending flange 326 on the bottom tripping plate 322. Continued movement of the velocity trip arm 290 during the playing cycle then causes the bottom tripping plate 322 to be moved toward the spindle 52. Since the upper tripping plate 332 rests on the bottom tripping plate 322 the upper tripping plate 332 rides with the lower plate 322 and is also moved toward the spindle. Shortly after such movement of the upper plate 332 commences, the upturned flange 334 thereof is moved into the path of the flange 336 on the hub 174. However, since forward movement of the arm 290 during the playing period is very slow, the flange 334 is not moved with sufficient velocity to place the edge 334*a* thereof in a position to be struck by the vertical edge 336*a* of the flange 336. Instead, the flange 334 is moved forwardly at a sufficiently slow rate that the flange 336 strikes the face portion 334*b* (FIG. 3) of the flange 334 once for each revolution of the turntable and thus slides the upper plate 332 rearwardly over the bottom plate 322 in small increments, one for each rotation of the turntable. Accordingly, during the playing cycle the bottom plate 322 is moved continuously forward by the trip arm 290 while the top plate 332 is intermittently pushed back over the bottom plate 322 by the above described action of the flange 336 on the face 334*b*. However, when the runout groove of the record is traversed by the stylus, the trip arm 290 moves forward with a substantially increased velocity so that the flange 334 is moved forwardly at a relatively rapid rate sufficient to place the edge 334*a* thereof in the path of the edge 336*a* of the flange 336. When this occurs a tripping force is exerted through the upper plate 332 and the stud 324 to the gear 154 so as to move it by an amount sufficient to place the gear teeth 181 in engagement with the gear teeth 184 on the gear 154, thus initiating the record changing cycle. As described heretofore, during the record changing cycle the tripping plates 322 and 332 are reset by engagement with the shoulder 368 on the flange 192 of the shutoff lever 194 and later in the record changing cycle, after the tone arm 70 has been moved outwardly over the rest post, the detent pin 188 engages the tip 330 of the velocity trip arm 290 and moves this arm rearwardly to its starting position shown in FIG. 3 so that the entire velocity tripping mechanism is reset by movement of the gear 154 during the record changing cycle. The trip arm 290 is thus placed in position for engagement by the arm 498 on the tone arm bracket 76 during the next playing cycle. In connection with the provision of the flexibly mounted sleeve 494, it is pointed out that the spring 492 holds the sleeve 494 in a vertical position with sufficient force to permit the arm portion 498 to move the trip arm 290 forwardly in the manner described. However, if for any reason the trip arm 290 is held against forward movement while the tone arm is moved inwardly, or the trip arm 290 is reset while the tone arm is held over the turntable, the spring mounting of the sleeve 494 permits this sleeve to tilt from the vertical so as to provide a safety feature which prevents jamming of the velocity tripping mechanism.

In order to prevent the tone arm stylus from skipping inwardly across the initial grooves of the record as the tone arm is lowered onto the record during the latter part of the record changing cycle, a slight restraining force is exerted on the tone arm as the stylus is lowered onto the record which is sufficient to prevent the stylus from skidding over the slick surface of the lead-in groove portion of the record, this force being small enough, however, to be readily overcome when the stylus is engaged by the lead-in groove so that the stylus is led into the initial recorded groove of the record without inward skipping or skating. In accordance with an important feature of the present invention, movement of the cycling slide 370 is so controlled near the end of the record changing cycle that the above described restraining force is removed at substantially the end of the record changing cycle so that the stylus is thereafter free to move inwardly over the record grooves without causing any appreciable wear on the record. To this end, the transverse slot 374 provided in the cycling slide 370 is provided with a notch portion in one edge thereof which includes an arcuate section 510 which extends along an arc of a circle of the same radius as the path of the outer edge of the pin 372 so that during that portion of the record changing cycle wherein the pin 372 engages the arcuate portion 510 no movement of the cycling slide 370 is produced. This notch also includes a steep sloping portion 512 which connects the arcuate portion 510 with the main side wall 514 of the slot 374. Accordingly, during the period when the pin 372 traverses the arcuate portion 510 of this notch, as shown for example in FIG. 21, no corresponding movement of the cycling slide 370 is produced due to the above described relationship of the arc 510 to the path of movement of the pin 372. However, at substantially the end of the record changing cycle the pin 372 engages the steeply sloped portion 512 of this notch and functions to move the slide 370 abruptly to the right as viewed in FIG. 21. By providing the uniquely shaped notch 510, 512, this abrupt movement at the end of the cycle is produced while providing a relatively short main base assembly 42. Thus, with the disclosed arrangement the cycling slide may be moved from the position shown in FIG. 21 to the position shown in FIG. 3 with a very few degrees of rotation of the gear 154 whereas if a conventional transverse slot were employed and the notch 510, 512 eliminated, both the gear and the cycling slide would have to be made considerably larger with consequent greater movement of the cycling slide during the record changing cycle to obtain the same amount of movement of the slide for the same number of degrees of rotation of the gear at the end of the cycle.

The delayed movement of the cycling slide 370 is employed for several purposes in accordance with the present invention. First, this delayed movement is employed to produce a substantial abrupt movement of the slide at the very end of the record changing cycle which abrupt movement can be employed to release the anti-skate restraining force on the tone arm 70. This delayed action of the cycling slide is also employed in conjunction with the automatic shutoff mechanism of the changer so that power is stored in the shutoff spring 200 during a period when the cycling slide 370 is disengaged from the driving gear 154 so that the load on the record changing mechanism is more uniformly distributed and stalling or overloading of the mechanism is positively prevented. The abrupt movement at the end of the record changing cycle may also be employed to control the operation of a muting switch so that opening of this switch is delayed by an amount sufficient to mute the tone arm cartridge during substantially the first entire revolution after the stylus has engaged a record on the turntable, as will be described in more detail hereinafter in connection with the alternative embodiment of FIG. 30.

Considering now the manner in which an anti-skate restraining force is exerted on the tone arm assembly 70 as the stylus engages the record and is released in accordance with the above described movement of the slide 370 at substantially the end of the record changing cycle, a bushing 520 (FIG. 27) is secured to the bottom flange 410 of the tone arm bracket 76 and surrounds the pivot pin 80 so as to provide a bottom bearing for the bracket 76 to permit this bracket to be rotated about the pin 80. The bushing 510 is provided with a pair of flanges 522 and 524 between which there is positioned a coil spring 526 which engages the underside of the flange 522 and bears on a restraining member 528 so that this member is pressed against the upper surface of the flange 524. The restraining member 528 is provided with an arm 529 having an upturned end portion 530 which is adapted to engage a downturned flange 532 on the rear portion 380 of the cycling slide 370. The bottom end portion 534 (FIG. 29) of the spring 526 extends outwardly to a point beyond one edge of the vertical side wall 535 of the tone arm bracket 76 and the upper end portion 538 of the coil spring 526 extends outwardly to a point beyond the other side of the vertically extending portion 535 of the bracket 76. The restraining member 528 is provided with a hub portion 540 which seats on the flange 524 and is urged against this flange with a predetermined force determined by the coil spring 526. The member 528 also includes a projecting arm 542 which is adapted to engage the side wall 143 of the main bracket 142 upon outward movement of the tone arm during the record changing cycle so that the member 528 is indexed properly relative to the tone arm during each record changing cycle.

As the tone arm assembly 70 is moved inwardly and the stylus is lowered onto a record on the turntable 54, the upstanding arm 530 of the member 528 engages the flange 532 so that the member 528 is prevented from rotating with the tone arm bracket 76. This results in a slight restraining force being exerted on the tone arm assembly 70 which force is determined by the coil spring 526 pressing the hub portion 540 against the flange 524 and is sufficient to prevent the stylus from skipping inwardly over the slick surface of the initial groove portion of the record. This restraining force continues to be applied to the tone arm 70 until the flange 532 is removed from the path of the arm 530. This does not occur until substantially the end of the record changing cycle when, due to the unique connection of the gear 154 with the cycling slide 370, there is an abrupt motion of the cycling slide 370 as the pin 372 traverses the steep portion 512 of the slide. The restraining force is thus applied to the stylus until it engages the lead-in groove of the record so that inward skipping or skating is positively prevented. Furthermore, by abruptly moving the slide 370 a substantial distance at the end of the changing cycle the restraining force is removed in a positive manner while at the same time completing all movement during the record changing cycle so that no further operations are necessary to remove the restraining force after the playing cycle has begun.

It will be understood that as the record is played the member 528 moves with the tone arm so that the upstanding arm 530 moves inwardly to a position substantially behind the flange 532. When the next record changing cycle is initiated the arm 530 will be moved outwardly with the tone arm and will strike the rear side of the flange 532. However, when the arm 530 is thus restrained, the arm 534 of the spring 526 will move away from the edge of the side wall 535 of the bracket 76 since this arm is restrained by a slightly upturned prong 546 formed on the hub 540 of the member 528. When the slide has been moved to its forwardmost position the flange 532 is then moved out of the path of the arm 530 thus permitting the member 528 to be reregistered with the tone arm bracket 76 since the arms 534 and 538 of the spring 526 are biased toward each other by an amount sufficient to bring the member 528 to the correct indexing position shown in FIG. 27. Accordingly, the arm 530 is then properly positioned for engagement of the front surface of the flange 532 as the tone arm is moved inwardly over the record and deposited thereon.

Figure 9:
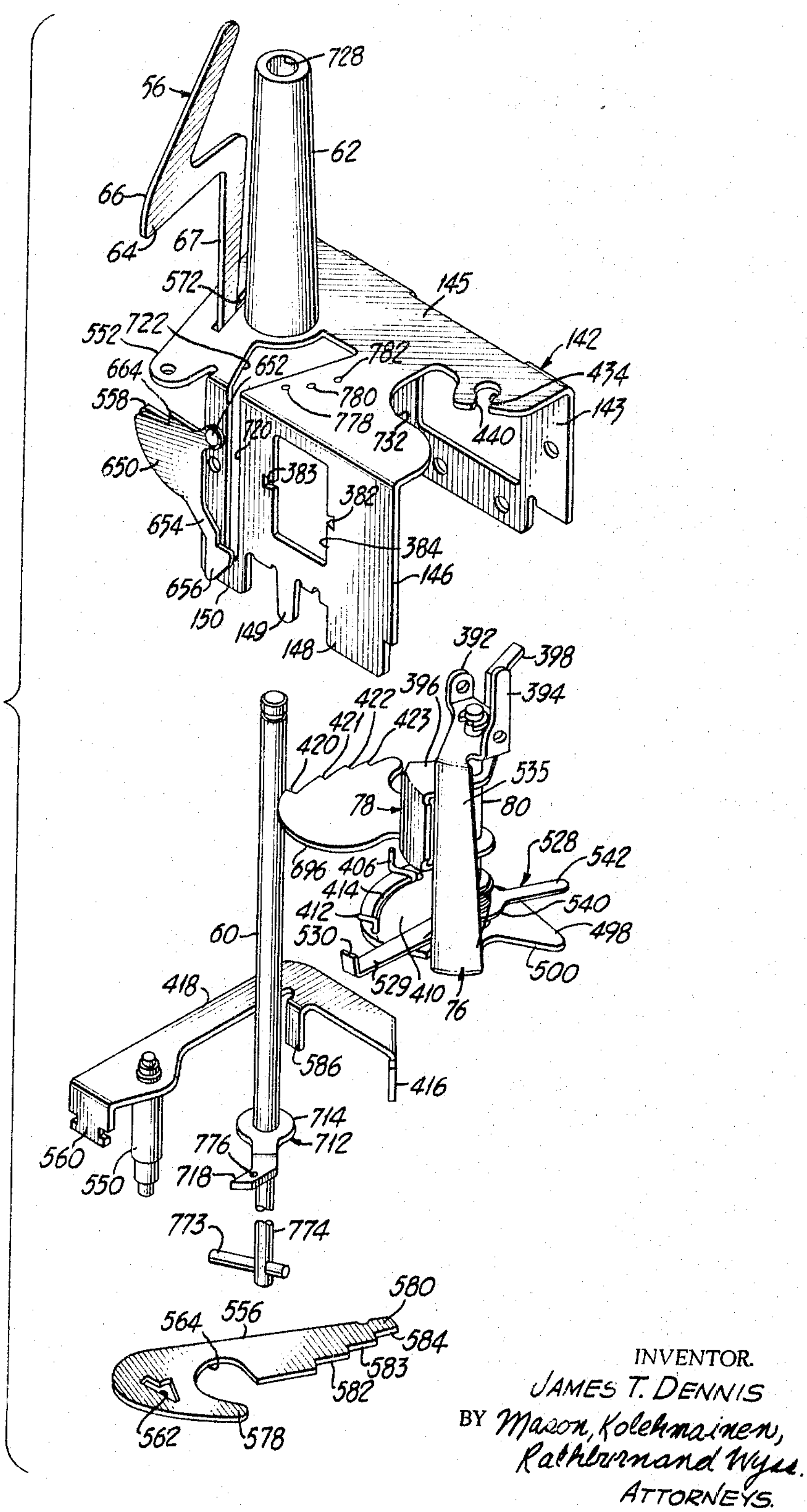
FIG. 9 is an exploded view showing the tone arm mounting and indexing mechanism of the main base subassembly of FIG. 6.
Figures 25, 26, 30:
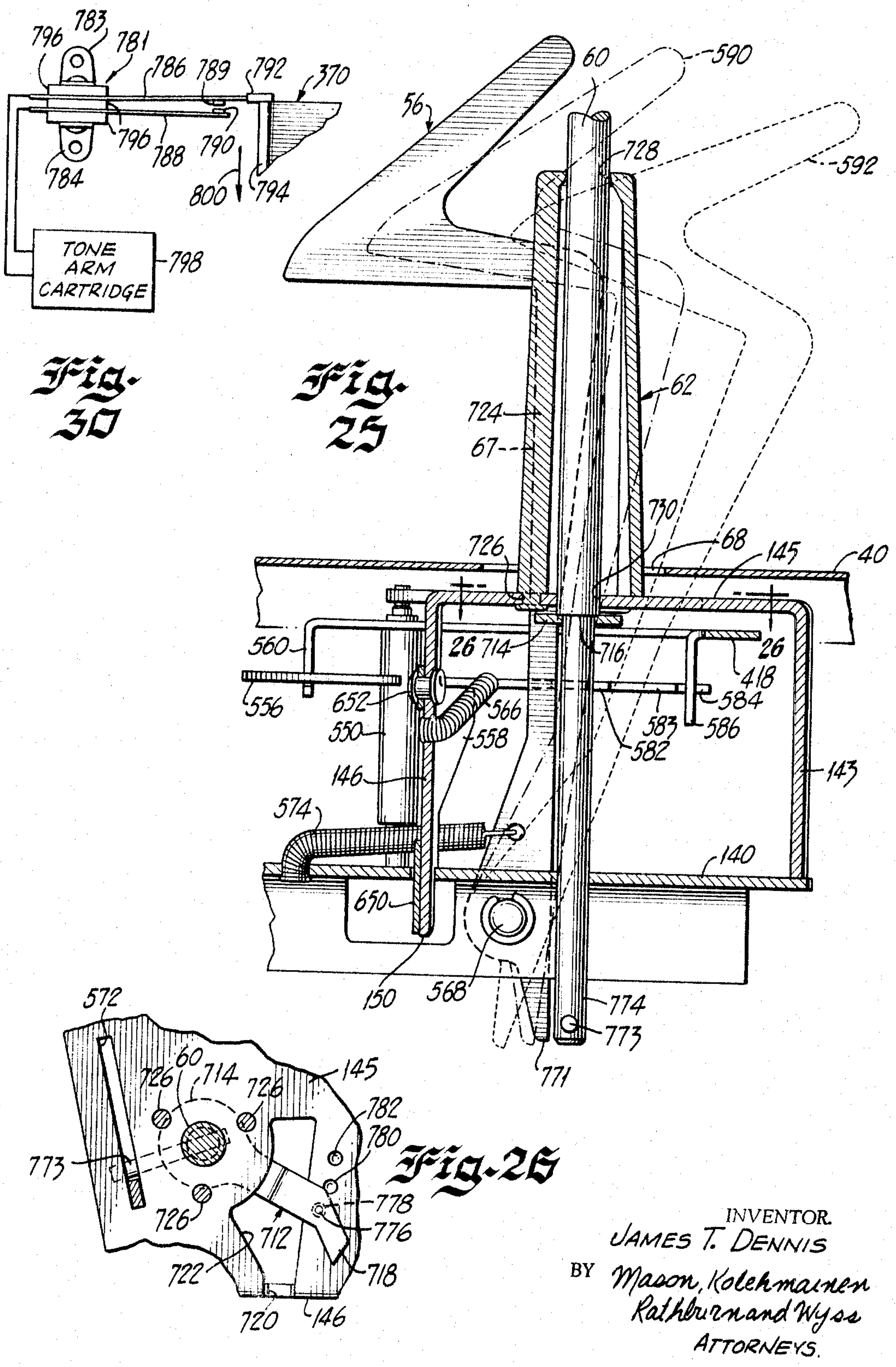
FIG. 25 is a fragmentary sectional view taken along the lines 25—25 of FIG. 1 illustrating the indexing positions of the tone arm indexing member.
FIG. 26 is a fragmentary plan view taken along the lines 26—26 of FIG. 25.
FIG. 30 is a plan view of an alternative embodiment of the invention in which a tone arm cartridge muting arrangement is provided.

Considering now the tone arm indexing mechanism of the record changer of the present invention, as described generally heretofore, facilities are provided for indexing the tone arm assembly 70 in response to the dropping of a record so that the stylus is correctly positioned to be lowered into the lead-in groove of records of each of the three standard diameters, i.e., seven inch, ten inch and twelve inch diameters. More particularly, the index pawl 418 is secured to the upper end of a post 550 (FIG. 9). The post 550 is pivotally mounted in a vertical position between an ear portion 552 formed in the top wall of the main bracket 142 and an ear portion 554 (FIG. 5) projecting horizontally from the main base member 140, so that the pawl 418 is mounted for pivotal movement in a horizontal plane about the post 550. Positioned beneath the pawl 418 is an index pawl stop 556 which normally rests on the upper edge of a sidewardly extending portion 558 of the side wall 146 of the main bracket 142. The pawl stop 556 is pivotally connected to one end of the pawl 418 by providing a downwardly extending notched tongue portion 560 on the end of pawl 418 which fits into a generally V-shaped notch 562 in the pawl stop 556. The pawl stop 556 is also provided with a large clearance notch 564 around the post 550 so that the pawl stop 556 may be pivoted about the post 550 without touching the same. The pawl stop 556 is spring biased by means of a spring 566 which is connected between the pawl stop 556 and the side wall 146 of the main bracket 142. The tone arm indexing member 56 which is struck by ten or twelve inch records as they are deposited on the turntable, is pivotally mounted on a stud 568 (FIG. 23) which is positioned on an offset downturned flange portion 570 of the base member 140 and the shank portion 67 of the member 56 extends through a slot 572 (FIG. 3) in the top wall 145 of the main bracket 142. The member 56 is normally spring biased to the forward end of the slot 572 by means of a spring 574 which is connected from a point on the shank 67 somewhat above the stud 568 to the base member 140, as best illustrated in FIG. 25.

Considering now the operation of the above described tone arm indexing mechanism, when the cycling slide 370 is in the rest position shown in FIG. 3 an upturned flange portion 576 thereof is in engagement with a shoulder 578 on the index pawl stop 556 so that the tip portion 580 of the pawl stop 556 is pivoted outwardly, as illustrated in FIG. 3. In FIG. 3 the pawl 418 is shown positioned in engagement with the rest position step 423 on the bottom flange 404 of the tone arm index bracket 78, thus indicating that the tone arm is positioned on the rest post 72. When a record changing cycle is initiated and the cycling slide 370 moves forwardly, the flange 576 is removed from engagement with the shoulder 578 with the result that the spring 566 pivots the pawl stop 556 into engagement with the side of the shank portion 67 of the indexing member 56. The pawl stop 556 is provided with a seven inch indexing step 582, a ten inch indexing step 583 and a twelve inch indexing step 584 (FIG. 3). Accordingly, when the pawl stop 556 is thus moved by the spring 566 the step 582 will engage the shank portion 67 since at this point in the cycle the new record has not been released to the turntable.

The pawl 418 remains held in engagement with the rest position step 423 by means of the spring 426 at the beginning of the record changing cycle. However, when the tone arm indexing bracket 78 becomes registered with the tone arm bracket 76, by engagement of the tongue 398 in the notch 415 of the bracket 400, the tone arm indexing bracket 78 moves with the tone arm bracket 76 and is pivoted about the post 80 in a counterclockwise direction as viewed in FIG. 3 against the force of the spring 426 so that the pawl 418 is released. At the time the pawl 418 is released the step 582 on the pawl stop 556 is in engagement with the shank 67 so that the spring 566 exerts a force on the pawl stop 556 which is transmitted to the rear pivot 560, 562 and causes the pawl 418 to pivot in a counterclockwise direction about the post 550 (as viewed in FIG. 3) until a downturned flange 586 on the pawl 418 engages the tip 580 of the pawl stop 556.

When the pawl 418 is thus registered with the pawl stop 556 the tip portion 416 of the pawl 418 is in the path of the seven inch indexing step 420 on the bracket 78. Accordingly, if a seven inch record is deposited to the turntable the indexing member 56 is not struck since, as shown in FIG. 2, the tip of this member is beyond the edge of seven inch records. Under these conditions the step 582 remains in engagement with the shank 67 and the pawl 418 is engaged by the step 420 as the bracket 78 is rotated in a clockwise direction about the post 80 (FIG. 3) when the tone arm is moved inwardly to a position over the lead-in groove of a seven inch record. The tone arm assembly 70 is thus accurately positioned by engagement of the step 420 with the tip 416 of the pawl 418 so that the tone arm stylus is lowered into engagement with the lead-in groove portion of a seven inch record. If, on the other hand, a ten inch record is released to the turntable, the indexing member 56 is struck by the outer edge portion of this record and is moved to the dotted line position 590 shown in FIG. 25. When this occurs, the shank portion 67 is moved rearwardly within the slot 572 to a point sufficient that the step 583 of the pawl stop 556 is urged into engagement with the shank 67. The flange 586 remains in engagement with the tip 580 of the pawl stop 556 with the result that the pawl 418 is now positioned in the path of the ten inch step 421 on the bracket 78, and the tone arm is indexed in the correct position to engage the lead-in groove of a ten inch record. If a twelve inch record is released to the turntable the indexing member 56 is moved to the dotted line position 592 shown in FIG. 25 and the shank 67 of this member is moved to the position shown in FIG. 16, in which position the step 584 of the pawl stop 556 is urged into engagement with the side of the shank 67. Accordingly, the tip portion 416 of the pawl 418 is positioned in the path of the twelve inch step 422 of the bracket 78.

As the control slide 370 moves rearwardly during the last half of the record changing cycle, the bracket 78 is pivoted in a clockwise direction about the post 80 so as to bring the step 422 into engagement with the tip 416 on the pawl 418, as shown in FIG. 17. The spring 426 continues to hold the step 422 in engagement with the pawl tip 416. However, when the cycling slide 370 moves back to its rest position the flange 576 thereof engages the shoulder 578 on the pawl stop 556 and pivots the pawl stop 556 about the pivot 560, 562 to the position shown in FIG. 17. As the pawl stop 556 is thus pivoted away from the shank 67, the spring 574 urges the indexing member 56 forwardly until the shank 67 engages the forward edge of the notch 572. The indexing member 56 is thus repositioned in readiness for indexing the next record deposited on the turntable during the next record changing cycle.

In connection with the tone arm indexing mechanism described thus far, it is pointed out that this mechanism is generally similar to the tone arm indexing mechanism described in detail in my copending application Ser. No. 168,305, filed Jan. 16, 1962, which is a continuation of my earlier application Ser. No. 752,969, filed Aug. 4, 1958, and reference may be had to this copending application for a detailed description of the operation of the same. However, it is pointed out that the mounting of the pawl 518 on the post 550 provides an indexing arrangement which is positive in its action since the post 550 is supported at relatively widely spaced points so that the pawl 418 moves always in a horizontal plane without substantial wobble or tilting of the tip portion thereof. Also, it is pointed out that the pawl 418, post 550 and pawl stop 556 may be conveniently mounted as a separate subassembly at the time the main bracket 142 is assembled by inserting the post 550 into the holes located in the ears 552 and 554 described above.

Considering now the facilities provided in the changer of the present invention for automatically shutting off the changer, these facilites include an arrangement for initiating a so-called shutoff cycle during which the tone arm assembly 70 is positioned on the rest post 72, the motor 100 is deenergized and the idler 90 is withdrawn to the neutral position shown in FIG. 1. These automatic shutoff facilities may be set in motion either by actuation of the control knob 126 to the OFF position or may be actuated as a part of the record changing cycle which is initiated after the last record has been deposited on the turntable and played. Generally considered, the automatic shutoff facilities utilize the main gear 154 by bodily elevating this gear as it is rotating during a shutoff cycle. More particularly, when the control knob 126 is moved to the OFF position, the control rod 130 is moved in the direction of the arrow 600 (FIG. 17) so that the control lever 134 is pivoted about the mounting post 50 to the position shown in FIG. 17. A control slide indicated generally at 602 (FIG. 8) is slidably mounted on the base member 140 and is provided with a pair of rearwardly extending tongue portions 604 and 606 which straddle the depending flange 149 (FIG. 23) of the bracket wall 146 and extend through suitable apertures 605 and 607 formed in this wall. The rear portion of the tongue 606 is provided with an upturned end portion 610 which is positioned behind the bracket wall 146 and has a vertically extending spring arm 612 mounted thereon.

The control slide 602 is provided with an upturned flange 614 which is adapted to be engaged by a projecting shoulder portion 616 on the control lever 134 in the manner shown in FIG. 17. The control slide 602 is also provided with a forward upturned flange 618 which is positioned beneath the main gear 154 and a downturned flange portion 620 which extends through a slot 622 in the base member 140 and is provided with an end portion 623 to which a biasing spring 624 is connected, the other end of the spring 624 being secured to the base member 140, as best shown in FIG. 2. Normally the edge 626 between the tongues 604 and 606 of the control slide 602 is urged into engagement with the flange 149 so that the control slide 602 occupies the position shown in dotted lines at 628 in FIG. 17. However, when the control lever 134 is actuated as shown in FIG. 17, the shoulder 616 thereof engages the upturned flange 614 on the control slide 602 and moves this slide forwardly. The slot 622 in the base member 140 is provided when an offset portion defining a shoulder 630 and when the control slide 602 is moved forwardly by the above described movement of the lever 134 the flange portion 620 of the slide 602 moves to a point somewhat beyond the shoulder 630. Since the spring 624 exerts a sidewise bias on the control slide 602 the control slide is held in a latched forward position shown in full lines in FIG. 17 by engagement of the flange 620 with the shoulder 630 after the control knob 126 is released and the control lever 134 is returned to the neutral position shown in FIG. 3.

Movement of the control slide 602 to the position shown in full lines in FIG. 17 by actuation of the control lever 134 is also employed to move the velocity trip arm 290 toward the spindle 52 to initiate rotation of the gear 154 and start the shutoff cycle. To this end, the trip arm 290 is provided with an inclined edge 692 which is normally positioned across the slot 622 in the base member 140. When the control lever 134 moves the control slide 602 forwardly, the flange 620 thereof, which extends through the slot 622, engages the edge 692 of the trip arm 290 and moves this arm toward the spindle so that the tip 330 engages the flange 326 on the bottom tripping plate 322 and moves the flange 334 on the top tripping plate 332 into the path of the flange 336. In this connection it will be noted that since the head portion 296 of the trip arm 290 is guided by the ears 297 and 298, force exerted by the flange 620 on the inclined edge 692 results in forward movement of the trip arm 290 toward the spindle 52.

The main gear 154 is provided with a pair of arcuate slots 632 and 634 (FIG. 19) which define a cam portion indicated generally at 636 comprising a pair of downwardly inclined portions 638 and 642 and flat intermediate portion 640. When the control slide 602 has been latched in the forward position shown in FIG. 17, the flange portion 618 thereof is moved into the path of the cam portion 636. As the gear 154 rotates during the record changing cycle the gear 154 is bodily elevated off of the bearing 156 as the flange portion 618 engages the downwardly inclined cam portion 638 on the gear 154. Accordingly, when the gear has reached the position shown in FIG. 19 wherein the flange 618 is positioned on the central cam portion 640, the main gear 154 has been elevated by the amount shown in FIG. 20. In this position it will be seen that the pin 450, which extends downwardly from the gear 154 and normally actuates the spindle actuating crank 300 by engagement with the edge 474 thereof, has now been elevated by an amount sufficient to clear the spindle actuating crank 300 so that the control blade 452 is not actuated and no record is released to the turntable. This means that when the control knob 126 is turned to the OFF position no further record is deposited on the turntable during the shutoff cycle so that when the machine is started up again a record will not be missed. As the gear 154 continues to rotate it will descend as the flange 618 engages the cam portion 642. As this occurs, the pin 450 is lowered so that it rides on the upper surface of the spindle actuating crank 300 but does not actuate this member. As the gear 154 is rotated a little further the pin 450 is moved clear of the spindle actuating crank 300 and the gear drops down to its normal position on the bearing 156. It will be noted that the above described elevation of the main gear 154 to prevent a record from being dropped takes place somewhat ahead of the midpoint of the record changing cycle as the flange 618 engages the cam portion 636.

During a shutoff cycle it is also necessary to move the pawl 418 to the correct position to engage the rest step 423 on the tone arm indexing bracket 78 so that the tone arm 70 will be lowered into position on the rest post 72 as the shutoff cycle is completed. To this end, a control lever 650 (FIG. 18), generally formed in the shape of a quadrant, is pivotally mounted on a stud 652 secured to the vertical wall 146 of the main bracket 142. The quadrant lever 650 is provided with an offset arm portion 654 which terminates in an enlarged end portion 656 which extends downwardly below the base member 140 alongside the flange 150 of the bracket sidewall 146. To permit limited pivotal movement of the lever 650, the slot 658 (FIG. 8) provided in the base member 140 to receive the flange 150 is provided with a relatively wide portion and the tail portion 656 of the lever 650 may be moved within this wide portion of the slot 658.

Figures 4, 5:
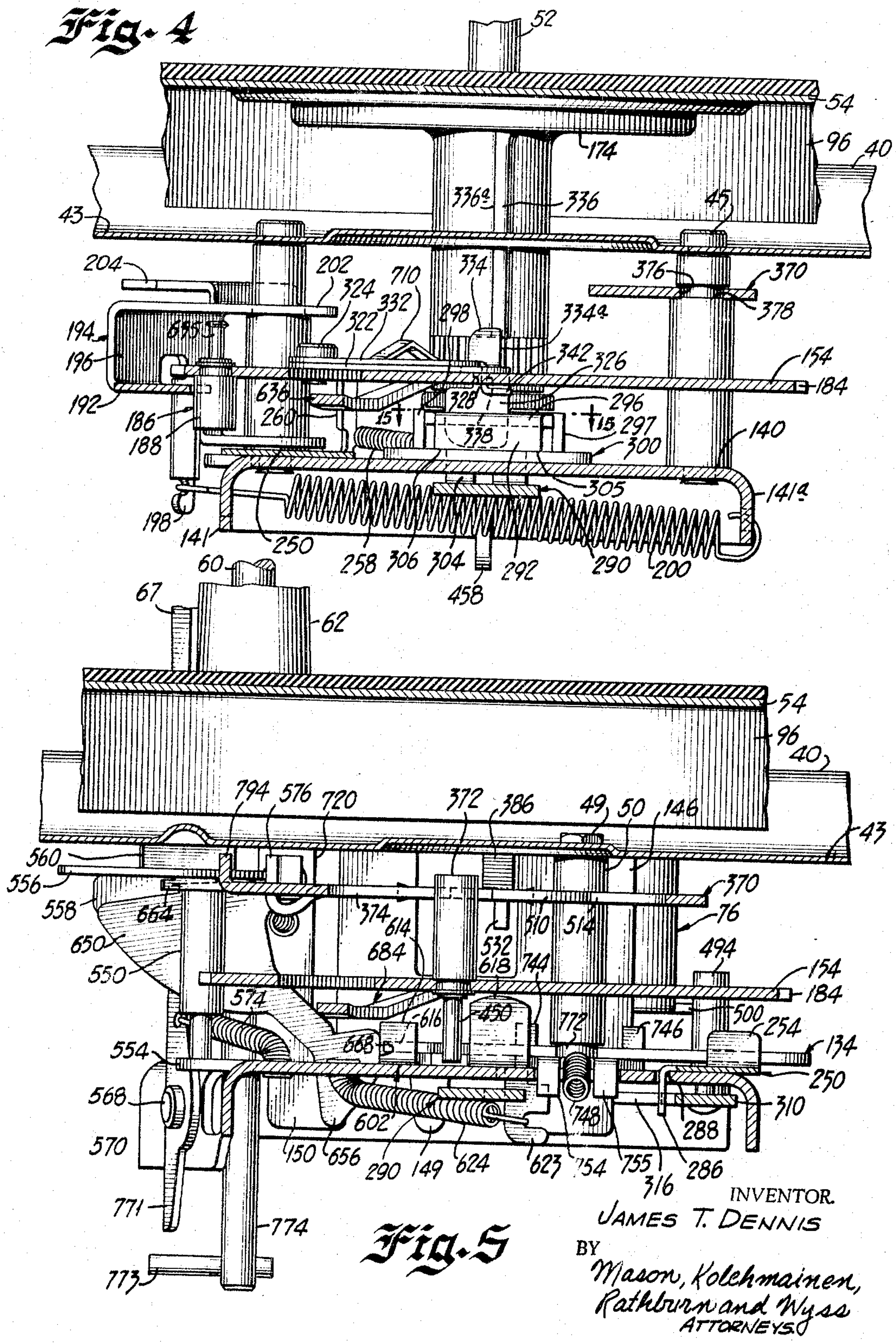
FIG. 4 is a sectional view taken along the lines 4—4 of FIG. 3.
FIG. 5 is a fragmentary sectional view taken along the lines 5—5 of FIG. 3.

The quadrant lever 650 is normally tilted slightly downwardly to the position shown in FIG. 5 in which position the edge 668 of the flange portion 656 engages the edge 662 (FIG. 10) of the control slide 602. This condition exists during periods when the machine is turned off and the control slide 602 occupies the position shown in FIG. 10 and also during periods when the machine is turned on and the control slide occupies the position shown in dotted lines at 628 in FIG. 17. When the quadrant lever 650 is in the position shown in FIG. 5 a vertically extending shoulder 664 formed in the upper edge of the quadrant lever 650 is positioned below the pawl stop 556 which rests on the bracket portion 558. Accordingly, when the quadrant lever 650 is shown in the position shown in FIG. 5 it is in an inactive position in which it exercises no control function. However, when the control slide is moved forwardly upon actuation of the control lever 134 to the position shown in full lines in FIG. 17, as described heretofore, an inclined shoulder 666 (FIG. 17) on the control slide 602 engages the edge 668 of the flange portion 656 of the quadrant lever 650 and cams this lever so that it pivots about the stud 652 to the position shown in FIG. 18, in which position the shoulder 664 extends above the top edge of the bracket portion 558. Since actuation of the control lever 134 and consequent pivotal movement of the quadrant lever 650 to the position shown in FIG. 18 takes place at the beginning of the shutoff cycle and while the main cycling slide 370 is in its rest position (FIG. 17), the pawl stop 556 is held in its outermost position by engagement of the flange 576 on the slide 370 with the shoulder 578 on pawl stop 556 so as to permit the shoulder 664 on the quadrant lever 650 to be moved up adjacent the edge 582 of the pawl stop 556.

When the quadrant lever 650 is moved to the position shown in FIG. 18, the shoulder 664 acts as a new pivot point which causes a force to be exerted on the pawl 418 in the direction of the arrow 670 in FIG. 17. More particularly, when the cycling slide 370 moves forwardly during the initial portion of the shutoff cycle and the flange 576 thereof is removed from the shoulder 578, the spring 566 urges the step portion 582 of the pawl stop 556 into engagement with the shoulder 664 of the quadrant lever 650 which causes the pawl stop 556 to exert a force on the pawl 418 in the direction of the arrow 672 (FIG. 17) through the pivot 560, 562. A force in the direction 572 at the pivot point 560, 562 results in the tip portion of the pawl 418 being continuously urged in the direction of the arrow 670 for the remainder of the shutoff cycle and until the flange 576 again engages the shoulder 578. Accordingly, when the tone arm index bracket 78 is rotated in a counterclockwise direction about the post 80 the pawl 418 does not fly outwardly until the flange 586 thereof engages the tip 580 of the pawl stop 556, as in a normal record changing cycle, but instead the tip 416 of the pawl 418 is urged against the bottom flange 404 of the bracket 78 and as the bracket 78 is rotated counterclockwise about the post 80 the tip 416 engages successively higher indexing steps until this tip engages the rest position index step 423 and then remains in engagement with this step. The tone arm is thus restrained over the rest post 72 and is lowered onto this rest post rather than at a seven inch, ten inch or twelve inch record position at the end of the shutoff cycle. The position of the tone arm indexing mechanism at the end of the shutoff cycle is illustrated in FIG. 3.

It will be recalled that during a shutoff cycle, the main gear 154 is bodily elevated by means of the coaction of the flange 618 on the control slide 602 and the cam portion 636 so that the spindle crank 300 is not actuated and no record is dropped during a shutoff cycle. However, as described heretofore the gear 154 returns to its normal level after the pin 450 is moved beyond the edge of the spindle crank 300. In order to actuate the shutoff lever 194, facilities are further provided in accordance with the present invention to elevate the main gear a second time during a shutoff cycle. More particularly, a pair of arcuate slots 680 and 682 are provided in the main gear 154 to define a second cam portion indicated generally at 684 and comprising a pair of downwardly inclined portions 686 and 688 and a central horizontal portion 690. The cam portion 684 is arranged to cooperate with the flange 618 on the control slide 602. However, since the cam portion 684 is on a different radius than the cam portion 636, it is necessary to reposition the control slide after the flange 618 thereof has engaged the cam portion 636 and before it engages the cam portion 684. Resetting of the control slide 602 is accomplished in accordance with the present invention by utilizing the rearward movement of the velocity trip arm 290 when this arm is reset by engagement of the index pin 188 with the tip portion 330 of the trip arm 290. It will be recalled from the previous description of the velocity tripping mechanism that the detent pin 188 moves into the path of the tip 330 when the gear 154 has been rotated approximately three-fourths of one revolution so that the trip arm 290 is moved rearwardly to the position shown in FIG. 15. The velocity trip arm 290 is provided with an inclined edge portion 692 (FIG. 3) which is positioned beneath the base member 140 and extends across the slot 622 therein. Accordingly, when the trip arm 290 is moved rearwardly by the detent pin 188 to the reset position indicated in dotted lines at 694 in FIG. 17, the inclined edge 692 of the trip arm 290 engages the flange portion 620 of the control slide 602 below the base member 140 and cams the forward portion of the control slide 602 to the right as viewed in FIG. 17 by an amount sufficient to move the flange portion 620 away from the shoulder 630 whereupon the spring 624 urges the control slide rearwardly to a position in which the upstanding spring arm 612, which is secured to the upturned end flange 610 of the control slide 602 strikes the rounded edge portion 696 of the bottom flange 404 of the tone arm index bracket 78, as shown in FIG. 3. In this connection it will be understood that the velocity trip arm 290 is reset at approximately three-fourths of the shutoff cycle, at which time the tone arm index bracket 78 has been moved to the position shown in FIG. 3 and the control lever 134 has been released to its neutral position so that the shoulder 616 thereof is withdrawn from the flange 614 to permit the control slide 602 to be moved rearwardly by the above described camming action of the inclined surface 692.

When the control slide 602 has been thus repositioned to the position shown in FIG. 3, the upturned flange portion 618 thereof is moved into the path of the cam portion 684 of the main gear 154. Accordingly, as the gear 154 rotates and the detent pin 188 is moved from engagement with the tip 330 of the trip arm 290 to the position shown in FIG. 21, the gear 154 is bodily elevated as the flange 618 engages the inclined cam surface 686 so that when the flange 618 engages the horizontal cam portion 690, the main gear 154 is bodily elevated to the position shown in FIG. 22. The detent pin 188 is formed with a portion 695 of relatively small diameter which extends above the upper surface of the gear 154. When the gear 154 is in its normal position seated on the bearing 156, the upper end of the pin 695 passes beneath the upper flange 202 of the shutoff lever 194 as the gear 154 is rotated during a normal record changing cycle. However, when the main gear 154 is elevated to the position shown in FIG. 22 by engagement of the flange 618 with the cam portion 684 of the pin 695 is positioned to engage the top flange 202 of the shutoff lever 194. The flange 202 is provided with a cam surface 696 (FIG. 21) which the pin 695 engages as the gear 154 continues to rotate from the position shown in FIG. 21. The shutoff lever 194 is thus pivoted about the post 46 to the position shown in FIG. 24 in which position the pin 695 engages the extreme tip of the upper flange 202 of the shutoff lever 194.

Figures 21, 22:
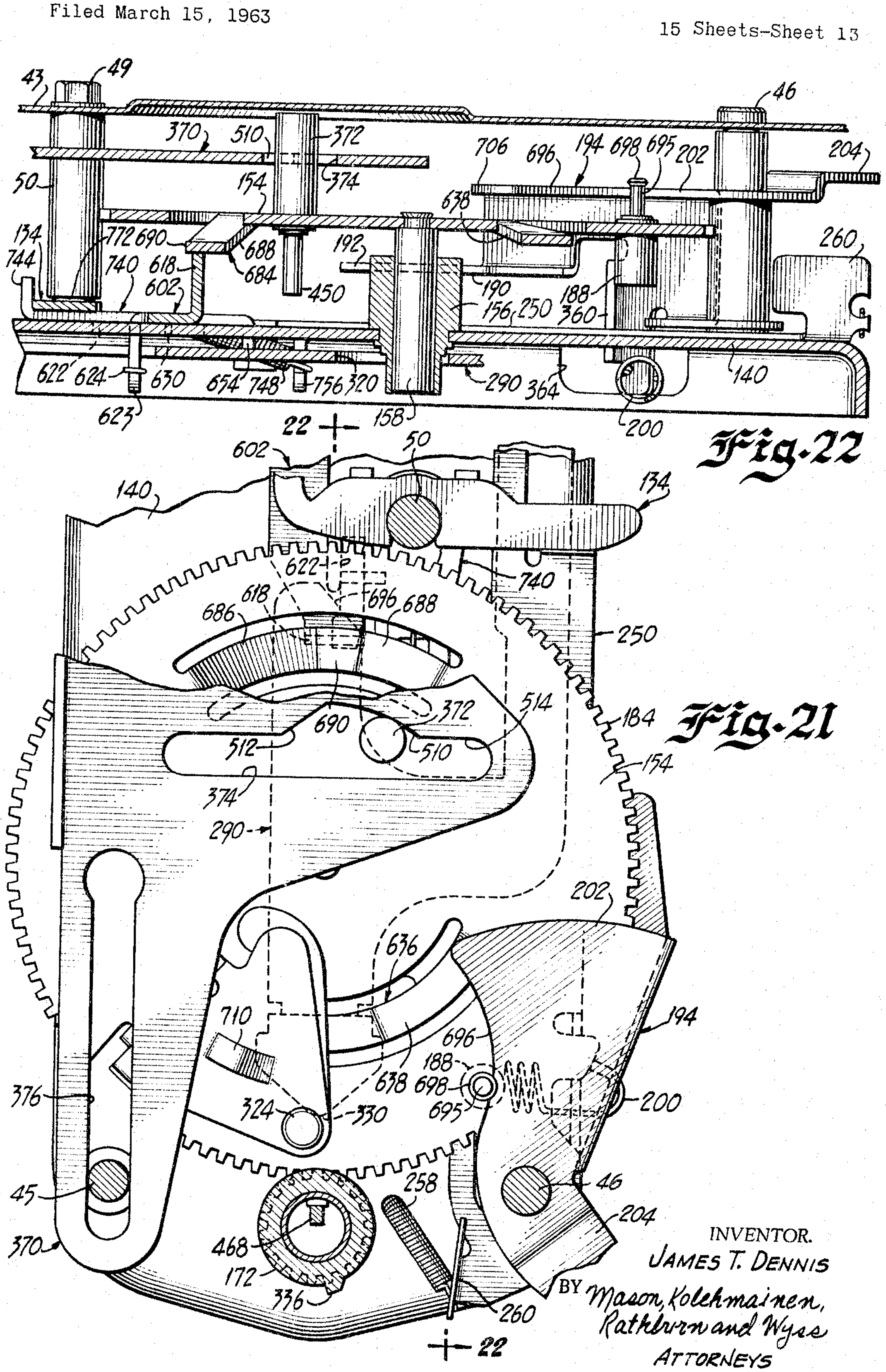
FIG. 21 is a fragmentary plan view of a portion of FIG. 3 showing the main gear in elevated position and the shutoff lever about to be actuated.
FIG. 22 is a sectional view taken along lines 22—22 of FIG. 21.
Figures 24, 28:
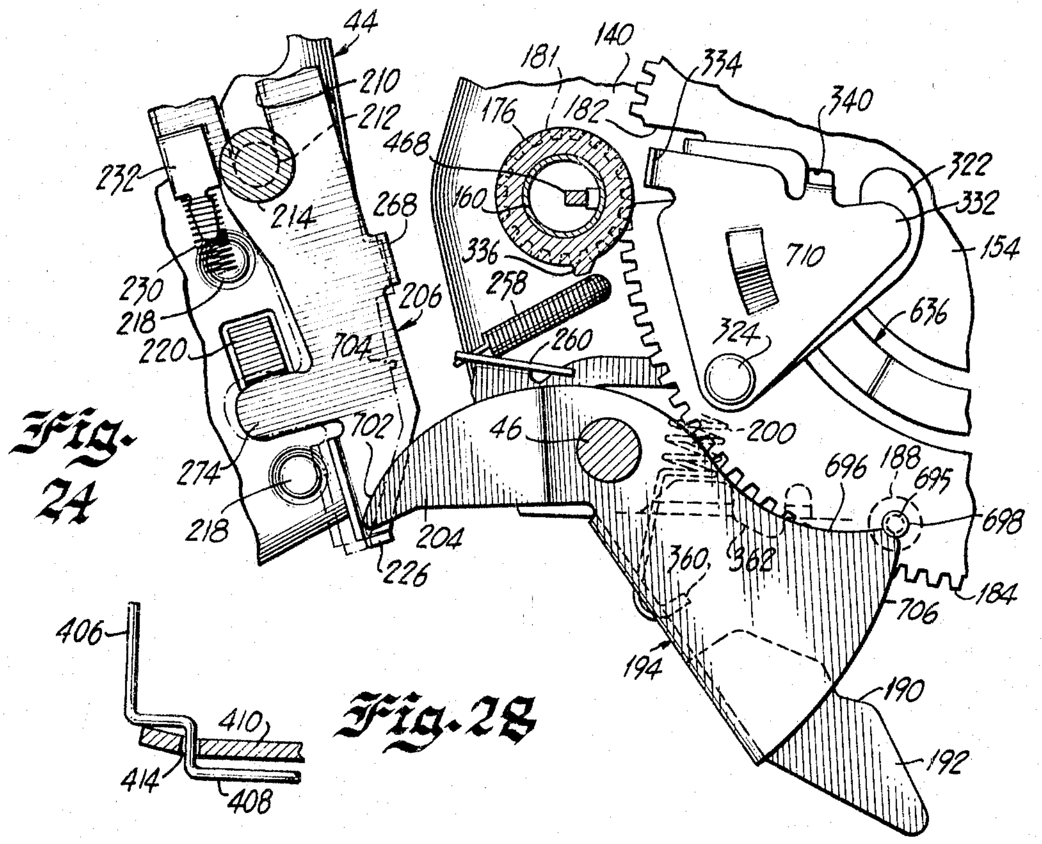
FIG. 24 is a fragmentary plan view of a portion of FIG. 10 shown on an enlarged scale and illustrating the manner in which the automatic shutoff mechanism is actuated.
FIG. 28 is a sectional view taken along the lines 28—28 of FIG. 3.

As the gear 154 moves from the position shown in FIG. 21 to the position shown in FIG. 24 the gear 154 would tend to drop as the cam portion 684 moves away from the flange 618 on the control slide 602. If substantial lowering of the gear 154 were permitted the pin 695 would move out of engagement with the cam surface 696. However, the pin 695 is provided with a rim portion 698 on the upper end thereof which overlies the cam surface 696 and holds the gear 154 is an elevated position by engagement with the upper edge of the flange 202 of the shutoff lever 194 even though the flange 618 has moved out of engagement with the cam section 688.

In accordance with an important feature of the invention, the main gear 154 is disengaged from the cycling slide 370 during at least the initial portion of the period during which the pin 695 engages the cam surface 696. This is important because during the initial engagement of the pin 695 with the cam surface 696 a substantial force is required to stretch the strong shutoff spring 200 which must be done to pivot the shutoff lever 194 about the post 46. Such disconnection of the cycling slide 370 is afforded by the arcuate portion 510 formed in the side 514 of the slot 374 which is so arranged that the pin 372 traverses the arcuate portion 510 during the period when the pin 695 engages the initial portion of the cam surface 696. Accordingly, the additional load of the cycling slide 370 is removed from the main gear 154 during the period when this gear is called upon to exert the most force in initially stretching the spring 200. By the time the pin 372 engages the inclined portion 512 on the slide 370 the shutoff lever 194 has been pivoted a substantial amount with the result that the spring 200 has been moved closer to the post 46 so that a modified toggle action is provided whereby less force is thereafter required to stretch the spring 200. Accordingly, as the pin 372 engages the inclined portion 512 and the additional load of moving the cycling slide is placed on the gear 154, the shutoff lever 194 may be pivoted the remaining amount to the position shown in FIG. 24 without unduly loading the driving mechanism.

As the shutoff lever 194 is pivoted from the position shown in FIG. 21 to the position shown in FIG. 24 the hook portion 204 thereof is moved in a path indicated by the arrow 700 in FIG. 24. The hook portion 204 is provided with a curved surface 702 which engages the end flange 226 on the shutoff bar 206 of the motor subassembly and pivots this bar about the bushing 214 to the position shown in dotted lines at 704 in FIG. 24 which is sufficient to permit the hook portion 204 to move behind the end flange 226 and let the shutoff bar snap back to the position shown in full lines in FIG. 24 due to the force of the springs 222 and 242 on the subassembly 44. The hook portion 204 is thus positioned inside the end flange 226 of the shutoff bar 206 as the shutoff lever 194 is moved to the position shown in FIG. 24.

When the pin 695 moves slightly beyond the position shown in FIG. 24, it engages a curved cam surface 706 on the upper flange 202 of the shutoff lever 194. Since the shutoff lever 194 is now no longer held by the pin 695, the spring 200 functions to pivot the shutoff lever 194 in a counterclockwise direction around the post 46 (FIG. 24) while the pin 695 remains in engagement with the camming surface 706 with the result that the shutoff lever 194 is rapidly brought back to the rest position shown in FIG. 3 wherein the detent pin 188 is positioned within the notch 190 in the lower flange portion 192 of the shutoff lever 194. This pivotal movement of the lever 194 causes the hook portion 204 thereof to engage the end flange 226 and move the shutoff bar 206 rapidly to the shutoff position shown in FIGS. 1 and 3. The motor switch 216 is thus rapidly actuated to the off position by engagement of the spring 230 with the switch lever 220. Furthermore, since a substantial amount of energy is stored in the spring 200 as the lever 194 is cocked, i.e., moved to the position of FIG. 24, the shutoff bar 206 is readily moved to the rest position shown in FIG. 1 in which the idler wheel 90 is moved to a neutral position out of engagement with the turntable rim 96 and the motor driveshaft 98.

The spring 200 serves the important additional function of providing a slight additional movement of the gear 154 so that the pin 372 can be moved the rest of the way up the steep incline 512 and the gear 154 positioned as shown in FIG. 3 with the notch 182 thereof substantially centered with respect to the driving teeth 181. Thus, even though the teeth 181 move out of engagement with the teeth 184 of the main gear 154 as this gear is moved slightly beyond the position shown in FIG. 24, the camming action of the cam surface 706 against the pin 695 as the shutoff lever is pivoted to the rest position shown in FIG. 3 functions to provide the above described additional movement of the gear 154 so that this gear is moved to the detented rest position shown in FIG. 3 also.

As the pin 695 is engaged by the cam surface 706 on the above described return stroke of the shutoff lever 194, the cap portion 698 of the pin 695 may fall off the edge of the camming surface 706 as the detent pin 188 is positioned in the notch 190, in which case the main gear 154 will drop down upon the bearing 156. On the other hand, the cam portion 698 may remain in engagement with the camming surface 706 as the detent pin 188 is positioned in the notch 190, in which case the gear 154 remains elevated. In this latter case the gear 154 will tend to drop at the start of the next record changing cycle as soon as the gear 154 has moved sufficiently to remove the cap portion 698 from the cam surface 706 so that as the gear 154 rotates at the start of the next record changing cycle it will drop onto the bearing 156. However, in order to insure that the gear 154 is properly seated on the bearing 156 at the beginning of the next record changing cycle following a shutoff cycle, an inclined plane cam portion 710 (FIG. 3) is provided on the upper tripping plate 332 which extends upwardly from the upper surface of the plate 332. Accordingly, as the gear 154 is rotated in the next record changing cycle the cam portion 710 engages the under side of the upper flange 202 of the shutoff lever and exerts a downward camming action on the main gear 154 which positively insures that this gear is seated on the bearing 156 at the beginning of the next record changing cycle and the upturned flange 334 may pass beneath the flange 202.

The automatic shutoff facilities of the present invention may also be actuated in response to the dropping of the balance arm 58 after the last record of the record stack supported on the spindle 52 has been deposited on the turntable 54. Furthermore, most of the shutoff facilities employed in the manner described heretofore in connection with a shutoff cycle actuated in response to movement of the control lever 134 are employed to achieve this balance arm shutoff arrangement. More particularly, the vertically extending balance arm shaft 60 is slidably and rotatably mounted in the housing 62 and a transversely extending guide arm indicated generally at 712 (FIG. 9) is provided with a hub portion 714 which is positioned on a shoulder 716 (FIG. 25) so that the guide arm 712 is secured to and moves with the shaft 60. The guide arm 712 is provided with an offset end portion 718 which is adapted to move within a vertically extending slot 720 (FIG. 9) provided in the bracket wall 146 of the main bracket 142. The extension 718 is also adapted to rest on the top wall 145 of the main bracket 142 as shown in FIG. 6, an irregularly shaped opening 722 being provided in the top wall 145 to permit such movement.

In order to mount the shaft 60 in a simple and economical manner, the housing 62 is preferably of hollow construction and includes a plurality of vertically extending ribs 724 (FIG. 25) which terminate in locating pin portions 726 which are positioned in accurately located positioning holes in the top wall 145 and are secured to this top wall by any suitable operation such as riveting or the like. An upper bearing surface 728 is provided in the top wall of the housing 62 and the top wall 145 of the bracket 142 is provided with an opening 730 which provides the bottom bearing for the shaft 60. In this manner a pair of widely spaced bearing supports are provided for the shaft 60 while employing a simple and economical construction which may be readily assembled. In this connection it will be understood that the locating studs 726 are accurately positioned on the wall 145 so that the aperture 730 may act as the bottom bearing for the shaft 60. The balance arm 58 is preferably secured to the upper end of the shaft 60 by means of a set screw 732 which pulls the hub portion 734 of the arm 58 into engagement with a flat surface 736 on the shaft 60, as illustrated in FIG. 2.

When a stack of records is to be played, the balance arm 58 is lifted upwardly until the tip 718 of the guide arm 712 clears the upper surface of the top bracket wall 145 whereupon the balance arm may be moved outwardly so that the tip portion 718 rests on the top wall 145. After the records have been placed on the spindle 52 the balance arm is swung inwardly so that the tip thereof is positioned adjacent the spindle 52 and the balance arm 58 is lowered onto the upper surface of the record stack. In this position the guide arm tip 718 is positioned within the slot 720 as shown in FIG. 18.

As successive records are played, the balance arm moves down proportionately within the slot 720. However, when the last record is released to the turntable, the support for the balance arm 58 is removed so that this arm moves downwardly until the collar 718 strikes the upper surface of the base member 140 as shown in FIG. 23. If desired, a rubber grommet (not shown) may be provided on the underside of the hub portion 718 so that an objectionable striking noise is not heard when the balance arm drops and the collar 714 engages the member 140. When the balance arm drops to the position shown in FIG. 23, the guide arm tip 718 engages the upper edge of the offset portion 654 of the quadrant lever 650 and cams this lever about the pivot 652 to the position shown in FIG. 23. Since the last record is not released until substantially the middle of the record changing cycle when the blade 452 of the spindle 52 is actuated in the manner described heretofore, the pawl stop 556 has been moved inwardly against the side of the shank portion 67 of the indexing member 56 before the quadrant lever is cammed upwardly to the position shown in FIG. 23. Accordingly, the shoulder 664 of the quadrant lever 650 is unable to move up beside the edge 582 of the pawl stop 556 and assume the position shown in FIG. 18, and instead engages the underside of the pawl stop 556 and lifts this member upwardly off of the flange portion 558 on which the stop 556 normally rests, as shown in FIG. 23. Accordingly, when the balance arm drops at the middle of the record changing cycle before the last record is played the quadrant lever 650 exercises no control action on the tone arm indexing mechanism with the result that the indexing member 56 is struck by the last record, the pawl stop 556 is positioned in accordance with the particular step 582–584 with which the shank 67 is engaged and the pawl 418 is positioned for engagement with the corresponding step of the tone arm indexing bracket 78 to position the tone arm for engagement with the lead-in groove of the last record.

At the end of the record changing cycle during which the balance arm is dropped, the pawl stop 556 is moved outwardly to the rest position shown in FIG. 17, by engagement of the flange 576 on the cycling slide 370 with the shoulder 578, so that the edge portion 582 of the pawl stop 556 moves beyond the shoulder 664 of the quadrant lever 650 and the pawl stop 556 drops back onto the upper edge of the bracket portion 558 and assumes the position shown in FIG. 18. The quadrant lever is thus placed in the correct position to index the pawl 418 for engagement with the rest position stop 423 during the last record shutoff cycle which is initiated after the last record has been played. It will thus be seen that the quadrant lever 650 may be moved to the controlling position shown in FIG. 18 either by forward movement of the control slide 602, as described heretofore and as illustrated in FIG. 18, or by the dropping of the balance arm when the last record is released. However, the controlling action of the quadrant lever in this latter case is not effective immediately since otherwise the tone arm 70 would be placed on the rest post instead of playing the last record. In this connection, it is pointed out that with the above described construction of the present invention the balance arm housing 62, shaft 60, and quadrant lever 650 may be mounted on the bracket 142 before this bracket is assembled to the base member 140. Accordingly, the registration of the guide arm tip 718 with the slot 720 and the actuation of the quadrant lever 650 by the guide arm tip 718 may be tested at a separate subassembly point before the bracket 142 is assembled to the base member 140.

After the last record has been played, a record changing cycle is initiated in the customary manner by means of the above described velocity tripping mechanism, so that the gear 154 starts to rotate. However, in accordance with the present invention, this record changing cycle is converted into a shutoff cycle in response to the positioning of the tone arm 70 on the rest post 72. More particularly, when the last record shutoff cycle is initiated, the control slide 602 is in the position shown in dotted lines at 628 in FIG. 17 since the curved edge portion 696 of the tone arm indexing bracket 78 is not moved forwardly by an amount sufficient to engage the upstanding spring arm 612 on the control slide 602 when the bracket 78 is in either the seven inch, ten inch or twelve inch indexing position, as will be evident from FIG. 17. Since the control slide 602 is not moved forwardly to the latched position shown in full lines in FIG. 17, as it was when the control lever 134 is actuated in the manner described above, the flange 618 is not positioned to engage the cam portion 636 so that as the main gear 154 rotates it is not elevated to lift the pin 450 above the spindle actuating crank 300. This means that the pin 450 actuates the spindle crank 300 in a normal manner but since no further records are positioned on the spindle 52 this actuation causes no ill effects.

It is, however, necessary to elevate the main gear 154 near the end of the last record shutoff cycle so that the pin 695 can engage the upper flange 202 of the shutoff lever and actuate this lever in the manner described heretofore. To this end, the spring arm 612 on the control slide 602 is so positioned that it is engaged by the curved edge 696 of the tone arm indexing bracket 78 as this bracket is pivoted in a counterclockwise direction, as viewed in FIG. 3, about the post 80 so that the control slide 602 is moved forwardly to the position shown in FIGS. 2 and 3 when the tone arm indexing bracket 78 is moved to the rest position shown in FIGS. 2 and 3 in which position the pawl 418 engages the rest position step 423 on the bracket 78. In this connection it will be recalled that the quadrant lever 650 is in the position shown in FIG. 18 when the last record shutoff cycle is initiated so that the lever 650 causes the pawl 418 to engage the rest position step 423, as described in detail heretofore. When the control slide 602 is in the position shown in FIGS. 2 and 3, the upstanding flange 618 thereof is positioned to engage the cam section 684 on the main gear 154 as the gear rotates to the position shown in FIG. 21. The main gear 154 is thus bodily elevated in the same manner as described heretofore in connection with a control knob initiated shutoff cycle so that the shutoff lever 194 is cocked by engagement of the pin 695 with the cam surface 696 and the changer is turned off in a manner described heretofore in detail in connection with such a shutoff cycle.

While the curved edge 696 of the tone arm indexing bracket 78 will engage the spring arm 612 during each record changing cycle as the tone arm is moved outwardly over the rest post 72, in which position the tone arm indexing bracket 78 moves to the position shown in FIG. 3, it will be understood that during normal record changing cycles the quadrant lever 650 is in the position shown in FIG. 5 and the pawl 418 is indexed to engage one of the steps 420, 421 or 422, rather than the rest step 423. Accordingly, the tone arm indexing bracket 78 will normally be restrained in a position such that the edge 696 is spaced from the spring arm 612 even though the control slide is biased to its rearmost position shown in dotted lines in 628 in FIG. 17 by the action of the spring 624. When the control slide 602 is in this inactive position the upstanding flange 618 thereof is positioned just outside the outer edge of the cam portion 684 so that the gear 154 is not elevated during a normal record changing cycle and the above described automatic shutoff facilities are not set in motion.

Considering now the control linkage and mounting arrangement provided for the control lever 134, it is pointed out that this lever is itself normally biased or detented to the mid-position shown in FIG. 3 so that no detent is required in connection with the control knob 126 to hold this knob in the neutral position shown in FIG. 1. The control return lever indicated generally at 740 (FIG. 8) is slidably mounted on the base member 140 and an elongated clearance opening 742 is provided in the control return lever 740 so that this member may be loosely mounted about the mounting post 50. The return lever 740 is provided with a pair of upstanding ears 744 and 746 and the lever 740 is biased rearwardly by means of a spring 748 which is connected between the lever 740 and a depending flange 750 (FIG. 22) formed in the base member 140. An elongated opening 752 is provided in the base member 140 which is adapted to receive the downturned end portions 754 and 755 of a pair of rearwardly extending tongue portions 756 and 758 provided on the control return lever 740. The downturned end portions 754 and 755 function to guide the lever 740 by engagement with the edges of the slot 752 and limit the extreme movement of this member in the direction of the arrow 760 in FIG. 17 by engagement with shoulder portions 762 (FIG. 8) of the opening 752. The control return lever 740 is normally biased by the spring 748 so that the ear portions 744 and 746 thereof engage the shoulder portions 764 and 766 on the control lever 134 so that this control lever is normally biased to the mid-position shown in FIG. 3 and a neutral detent action is thus provided for the control knob 126.

When the control knob 126 is actuated to the OFF position the lever 134 pivots about the post 50 so that the control return lever 740 is moved to the position shown in FIG. 17 against the strength of the spring 748 by engagement of the shoulder 766 with the ear 746. However, as soon as the control knob 126 is released the lever 134 is returned to its mid-position. In a similar manner when the control knob 126 is rotated to the ON-REJECT position the control lever 134 is pivoted about the post 50 to the position shown in FIG. 10 and the control return lever 740 is moved in the same direction as before against the force of the spring 748 by engagement of the shoulder 764 with the ear 744. Again, when the control knob 126 is released the lever 134 is returned to the mid-position by virtue of the force of the spring 748. It will be understood, of course, that when the control lever 134 is actuated to either of the positions shown in FIGS. 10 and 17, or the intermediate manual position shown in dotted lines at 284 in FIG. 10, the functions described in detail hereinbefore are initiated.

The above described control linkage is conveniently assembled in accordance with the present invention by providing a notch 770 in the control lever 134 which is adapted to be positioned about the post 50 beneath a shoulder 772 (FIG. 22) formed therein, the notch 770 being held in engagement with the undercut portion of the post 50 below the shoulder 772 by the spring biased control return lever 740. Such a mounting arrangement permits the lever 134 to be pivoted to the control positions described heretofore, while, at the same time, providing an arrangement which is extremely simple in assembly and disassembly. More particularly, to assemble the control linkage the control return lever 740 is positioned on the post and is held in a position such as shown in FIG. 17 against the force of the spring 748. The control lever 134 is then placed on the lever 740 and slid under the shoulder portion 772 of the post 50 whereupon pressure on the lever 740 may be released and the lever 134 is thereafter held in an assembled neutral position.

It is also pointed out that the control linkage of the present invention provides several safety features whereby the mechanism cannot be jammed if excessive force is exerted on the control knob 126 or this knob is held in either the OFF or ON-REJECT positions during a substantial portion of a record changing cycle. Thus, considering first the situation where the control lever 134 is moved to the ON-REJECT position shown in FIG. 10, in which position the flange 286 on the switch release slide 250 engages the shoulder 350 of the trip arm 290 and moves this arm forwardly to initiate a record changing cycle, forward movement of the trip arm 290 is limited by engagement of the offset arm portion 316 thereof with the bracket wall 146, as shown in FIG. 10. However, if an attempt is made to rotate the control knob 126 beyond the on position the trip arm 290 cannot be damaged because further pivotal movement of the control lever 134 is permitted due to the provision of the notch 770 therein and such further movement merely results in the control return lever 730 being moved an additional amount against the force of the spring 748. In a similar manner, when the control lever 134 has been moved to the OFF position shown in FIG. 17 and an additional pressure is exerted on the control knob 126 in the same direction, the control slide 602 may be moved forwardly until the flange portion 620 thereof engages the forward end of the slot 622 and when this occurs the control lever 134 may again move away from the pivot post 50 due to the provision of the notch 770. The control linkage is thus provided with a biasing action which may be overcome if excessive force is exerted on the control lever 134 so that damage to the mechanism controlled by the lever 134 is prevented.

A further important safety feature is provided by the control linkage of the present invention which takes care of the situation wherein the control knob 126 is moved to either the OFF position or the ON-REJECT position and is held in this position for a substantial portion of the ensuing record changing cycle. It will be recalled that the velocity trip arm 290 is moved rearwardly by the camming action of the detent pin 188 on the tip portion 330 thereof at approximately the three-quarters point in the record changing cycle. It will also be recalled that as the trip arm 290 is reset by moving the same rearwardly it engages the flange portion 620 of the control slide 602 and cams this portion away from the shoulder 630 so that the control slide may be reset to a different position. However, if the control lever 134 is held in the position shown in FIG. 17 during the period when the velocity trip arm 290 is being reset by the detent pin 188, the control slide 602 is prevented from being moved rearwardly since the shoulder 616 of the lever 134 will remain in engagement with the flange 614 on the slide 602. This set of conditions might tend to damage the trip arm 290. However, when an attempt is thus made to move the control slide 602 rearwardly, the control lever 134 may pivot about the end of the control rod 130 since the notch 770 permits the control lever to be moved away from the post 50. Accordingly, jamming of the control members associated with or controlled by the control lever 134 is positively prevented by the control linkage of the present invention. It is also pointed out that when the control lever 134 is pivoted away from the post 50 as the control knob is held in the manner described above, there is no substantial movement reflected back to the control knob 126 since the end of the control rod 130 merely moves sidewise in response to pivotal movement of the lever 134 away from the post 50.

In accordance with a further important feature of the present invention, the balance arm 58 is employed as a manually adjustable tone arm indexing member so that either a seven inch, ten inch or a twelve inch record on the turntable 54 may be repeated over and over again automatically. Such an arrangement is desirable in many instances, such as the study of languages, dancing instructions, and the like. To this end, the tone arm indexing member 56 is provided with a downwardly extending arm portion 771 (FIG. 18) which extends below the pivot pin 568. The arm 771 is adapted to be engaged by a transverse pin 773 which is connected to the bottom end portion 774 of the balance arm shaft 60. Furthermore, the balance arm mounting arrangement is provided with a suitbale detent arrangement so that a slight detent force is provided at positions generally above the edge portion of seven inch, ten and twelve inch records which force may be overcome as the balance arm is moved outwardly from its position adjacent the spindle 52. Such a detent arrangement is conveniently achieved by providing a downwardly projecting dimple 776 (FIG. 6) on the undersurface of the guide arm tip 718 and a series of three indentations 778, 780 and 782 (FIG. 9) formed in the top wall 145 of the main bracket 142. With this arrangement, when the balance arm 58 is lifted upwardly the guide arm tip 718 is moved up within the slot 720 and as the balance arm is then moved outwardly the guide arm tip 718 rests on the upper surface of the top wall 145. When the dimple 776 engages the indentation 778 a slight detent force informs the operator that the balance arm may be left in this position for repeated playing of a seven inch record. Preferably, the balance arm 58 is positioned generally above the lead-in groove of a seven inch record positioned on the turntable 54 when the dimple 776 engages the indentation 778. However, in this position the offset arm 773 does not engage the depending arm portion 771 of the tone arm indexing member 56 so that this member operates in the usual manner to index the tone arm 70 for a seven inch record. Thus, if a seven inch record is manually placed on the turntable 54 while the balance arm is in the above described seven inch position in the general vicinity of the edge portion of a seven inch record the changer of the present invention will play this record repeatedly, the automatic tripping mechanism functioning to initiate a record changing cycle each time the record is played and the tone arm 70 being indexed correctly for engagement with the lead-in groove of the seven inch record at the end of each record changing cycle.

If, now, it is desired to play a ten inch record repeatedly, the balance arm is moved somewhat further outwardly from the spindle 52 until the dimple 776 engages the indentation 780 on the bracket wall 145. When this occurs, the transverse arm 773 engages the arm portion 771 of the indexing member 56 and pivots this member to the ten inch indexing position shown in dotted lines at 590 in FIG. 25. Here again, the position of the balance arm when the dimple 776 engages the indentation 780 is preferably in the general vicinity above the edge of a ten inch record so that the operator is informed that the machine will play a ten inch record repeatedly. If a ten inch record is now placed on the turntable and a record changing cycle is initiated, the changer will play this ten inch record repeatedly and the tone arm will be properly indexed at the end of each record changing cycle for engagement with the lead-in groove of the ten inch record. In this connection it will be understood that the weight of the balance arm assembly holds the dimple 776 within the indentation 780 with sufficient force to overcome the normal biasing force of the spring 574 so that the member 56 is continuously held in the ten inch indexing position 590.

If it is desired to play a twelve inch record repeatedly, the balance arm is moved still further outwardly so that the dimple 776 engages the indentation 782 in which position the balance arm is positioned generally over the outer edge portion of a twelve inch record. During this movement of the balance arm, the transverse arm 773 engages the arm 771 and pivots the indexing member 56 to the twelve inch indexing position shown in dotted lines at 592 in FIG. 25. Accordingly, when a twelve inch record is placed on the turntable and a record changing cycle is initiated the machine will continue to play the twelve inch record over and over again with the tone arm 70 properly indexed to engage the lead-in groove of the twelve inch record at the end of each record changing cycle.

In the illustrated embodiment the above described twelve inch indexing position of the balance arm is utilized as the outermost position of the balance arm to which position the balance arm is moved when a stack of records is to be removed from the turntable after being played. However, it will be understood that a further indentation similar to the indentation 782, may be provided on the top wall 145 to index the balance arm at a point removed from the edge of twelve inch records, for example, to a point over the rest position of the tone arm 70, if such a further detent position is desired. In this latter case, a suitable arrangement should be provided either to provide a clearance for the further movement of the indexing member 56 so that it can move with the transverse arm 773 or a spring biasing arrangement may be employed to prevent further movement of the member 56 when the balance arm is moved from the twelve inch position to this detented rest post position.

In addition to providing the above described repeat play feature for all sizes of records, the control of the indexing member 56 by the positioning of the balance arm 58 in accordance with the present invention has the further advantage that this arrangement may be employed for manual play operation wherein it is not required that the record be repeated. More particularly, if a record of any diameter is to be played manually, it may be placed on the turntable 54 and the balance arm moved to the corresponding index position as determined by the above described detent action between the dimple 776 and the indentations on the top wall 145. For example, if a seven inch record is placed on the turntable, the balance arm is moved so that the dimple 776 engages the indentation 778. When the changer is turned on and a record changing cycle is initiated, the tone arm will be lifted off of the rest post 72 and will be automatically positioned over the lead-in groove of the seven inch record and lowered into engagement therewith. In a similar manner, if a ten inch record is placed on the turntable, the balance arm is moved to the ten inch indexing position as determined by the detent action of the dimple 776 and the indentation 780 and when a record changing cycle is initiated the tone arm will be automatically positioned and lowered into engagement with the lead-in groove of the ten inch record. If a twelve inch record is to be played manually, the balance arm may be moved to the twelve inch indexing position and the tone arm automatically deposited in the lead-in groove of the twelve inch record. This manual play arrangement of the present invention thus avoids the condition wherein the operator must grab the tone arm and position it manually on the record, which is undesirable because the operator may scratch the record when he positions the tone arm stylus on it. Such a condition occurs however, in those changers in which no provision is made for indexing the tone arm during manual play since in most of these arrangements the tone arm is indexed to a seven inch record position irrespective of the size of the record placed on the turntable for manual play.

It will also be noted with the above described balance arm indexing arrangement, when the balance arm 58 is moved outwardly to the twelve inch record position, the tone arm 70 is controlled as though a twelve inch record were being played and is lowered downwardly at a point beyond the edge of the turntable 54. Thus, if for any reason an automatic record changing cycle is intiated while a record is not on the turntable, the positioning of the balance arm 58 in the above described twelve inch indexing position assures that the tone arm will not be deposited on the surface of the turntable 54 with consequent damage to the stylus thereof.

In accordance with a further important feature of the present invention, the lost motion arrangement provided by the arcuate portion 510 of the notch 374 in the cycling slide 370, whereby movement of the cycling slide is delayed during the latter portion of the record changing cycle and an abrupt movement of this slide is produced at substantially the end of the record changing cycle when the pin 372 traverses the steep slope portion 512, is employed to control a tone arm cartridge muting arrangement. More particularly, there is shown in FIG. 30 an alternative embodiment of the invention wherein a muting switch indicated generally at 781 is arranged to be mounted on the underside of the depressed portion 43 of the base plate 40 by means of the ears 783 and 784. The switch 781 includes a pair of flexible spring arms or blades 786 and 788 which carry the contacts 789 and 790 respectively near the free end thereof. The arm 786 is somewhat longer than the arm 788 and is provided with a cap 792 of insulating material which is adapted to be engaged by an upturned flange 794 on the main cycling slide 370. The switch arms 786 and 788 are insulatedly mounted by means of the spacers 796 of insulating material and are connected to the terminals of the tone arm cartridge 798 provided in the tone arm assembly 70.

When the cycling slide 370 is in the rest position shown, for example, in FIG. 3, the end of the flange 794 engages the cap 792 and flexes the arm 786 so that the contacts 789 and 790 are opened. However, as soon as a record changing cycle is initiated and the slide 370 moves in the direction of the arrow 800 shown in FIG. 28, the arm 786 is restored to its normal position in which position the contacts 789 and 790 are closed so that the tone arm cartridge 798 is muted. This muting condition obtains until the very end of the record changing cycle when the pin 372 engages the steeply sloped portion 512 of the cycling slide 370 and provides an abrupt movement of this slide to its rest position at the end of the record changing cycle. When this abrupt movement occurs the contacts 789, 790 are opened so that normal operation of the tone arm cartridge 798 is restored.

As described previously, the tone arm 70 is lowered so that the stylus thereof engages the slick surface of the record in the area of the lead-in groove approximately one revolution before the end of the record changing cycle. In conventional changers, lowering of the tone arm stylus onto the record is done at substantially the end of the record changing cycle so that the muting switch must be opened very shortly after the stylus engages the record. This means that a hissing noise is heard in the loudspeaker during the period when the tone arm cartridge is unmuted while the stylus engages the slick surface of the record. Once the stylus engages the lead-in groove the hissing noise disappears. In accordance with the embodiment of FIG. 30, the cartridge 798 remains muted for substantially one revolution of the turntable after the tone arm stylus has been moved into engagement with the slick surface of the record. This insures that no hissing noise is produced in the loudspeaker system while the stylus engages the slick surface of the record and before the lead-in groove picks up the stylus. Muting of the cartridge 798 may be thus prolonged in accordance with the invention because the turntable rotates without attendant movement of the cycling slide 370 during the period when the pin 372 traverses the arcuate portion 510 of the slide 370. Also, the abrupt movement of the slide 370 at the end of the record changing cycle insures positive opening of the muting switch contacts 789, 790. In this connection it will be understood that whereas the muting switch 780 has been illustrated as being of the flexible arm type, any other suitable type of electrical switch may be employed which is controlled in accordance with the above described abrupt movement of the cycling slide 370 to provide prolonged muting of the tone arm cartridge in the manner described heretofore.

While there have been illustrated and described several embodiments of the present invention, it will be understood that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In an automatic record changer, a driving gear, a tone arm, a main gear having an opening in the periphery thereof, said main gear engaging said driving gear except when positioned in a neutral position in which said opening in said main gear is adjacent said driving gear, a velocity trip mechanism including a pair of members pivotally mounted on said main gear in predetermined relation thereto, one of said members having a flange portion extending into said opening in the periphery of said main gear, means responsive to inward movement of said tone arm for moving said members radially outwardly from the center of said main gear and in the direction of said driving gear, detent means for holding said main gear on said neutral position between record changing cycles, said detent means comprising a pin rotatable with said main gear, a shutoff lever pivotally mounted beyond the edge of said main gear and provided with means defining a notch adapted to receive said pin, and means biasing said lever in the direction to retain said pin within said notch with a predetermined force which must be overcome to initiate rotation of said main gear, means responsive to movement of said members in said direction for engaging said driving gear with said main gear to initiate rotation of said main gear, said flange on one of said velocity trip members being positioned to be engaged by said shutoff lever as said main gear is rotated so that said velocity trip members are reset to restore said predetermined relation for the next playing cycle.

2. In an automatic record changer, a driving gear, a tone arm, a main gear having an opening in the periphery thereof, said main gear engaging said driving gear except when positioned in a neutral position in which said opening in said main gear is adjacent said driving gear, a velocity trip mechanism including a pair of members pivotally mounted on said main gear in predetermined relation thereto, one of said members having a flange portion extending into said opening in the periphery of said main gear, means responsive to inward movement of said tone arm for moving said members radially outwardly from the center of said main gear and in the direction of said driving gear, detent means for holding said main gear on said neutral position between record changing cycles, said detent means comprising a pin rotatable with said main gear, a shutoff lever pivotally mounted beyond the edge of said main gear and provided with means defining a notch adapted to receive said pin, and means biasing said lever in the direction to retain said pin within said notch with a predetermined force which must be overcome to initiate rotation of said main gear, means responsive to movement of said members in said direction for engaging said driving gear with said main gear to initiate rotation of said main gear, said flange on one of said velocity trip members being positioned to be engaged by said shutoff lever as said main gear is rotated so that said velocity trip members are moved radially inwardly and are reset to restore said predetermined relation for the next playing cycle.

3. In an automatic record changer, a tone arm, a main gear having a notch in the periphery thereof, a driving gear having a lug rotatable therewith, detent means normally positioning said main gear so that said notch is opposite said driving gear and said main and driving gears are disengaged, a velocity tripping mechanism including a first tripping plate resting on the upper surface of said main gear and pivotally mounted for limited movement relative to said main gear, and a second tripping plate resting on said first tripping plate and pivotally mounted for limited movement relative to said first plate and said main gear, said first plate having a downturned flange portion positioned within said notch and extending below said main gear, said first and second plates having an initial position in which said flange is spaced a substantial distance from said driving gear, means responsive to inward movement of said tone arm for moving said plates toward said driving gear by engagement with said flange, said second plate having an upturned lug adapted to be engaged by said driving gear lug to initiate rotation of said main gear when said second plate is moved toward said driving gear at a predetermined velocity, and means including said detent means for resetting both said first and second tripping plates to said initial position as said main gear is rotated.

4. In an automatic record changer, a tone arm, a main gear having a notch in the periphery thereof, a driving gear having a lug rotatable therewith, detent means normally positioning said main gear so that said notch is opposite said driving gear and said main and driving gears are disengaged, a velocity tripping mechanism including a first tripping plate resting on the upper surface of said main gear and pivotally mounted for limited movement relative to said main gear, and a second tripping plate resting on said first tripping plate and pivotally mounted for limited movement relative to said first plate and said main gear, said first plate having a downturned flange portion positioned within said notch and extending below said main gear, said first and second plates having an initial position in which said flange is spaced a substantial distance from said driving gear, means responsive to inward movement of said tone arm for moving said plates toward said driving gear by engagement with said flange, said second plate having an upturned lug adapted to be engaged by said driving gear lug to initiate rotation of said main gear when said second plate is moved toward said driving gear at a predetermined velocity, and means positioning a portion of said detent means in the path of said flange, whereby said tripping plates are reset to said initial position by engagement of said flange with said detent portion as said main gear is rotated.

5. In an automatic record changer, a tone arm, a main gear having a notch in the periphery thereof, a driving gear having a lug rotatable therewith, detent means normally positioning said main gear so that said notch is opposite said driving gear and said main and driving gears are disengaged, a velocity tripping mechanism including a first tripping plate resting on the upper surface of said main gear and pivotally mounted for limited movement relative to said main gear, and a second tripping plate resting on said first tripping plate and pivotally mounted for limited movement relative to said first plate and said main gear, said first plate having a downturned flange portion positioned within said notch and extending below said main gear, said first and second plates having an initial position in which said flange is spaced a substantial distance from said driving gear, means responsive to inward movement of said tone arm for moving said plates toward said driving gear by engagement with said flange, said second plate having an upturned lug adapted to be engaged by said driving gear lug to initiate rotation of said main gear when said second plate is moved toward said driving gear at a predetermined velocity, a stop, means biasing said detent means against said stop after rotation of said main gear is initiated, said detent means having a portion which is positioned in the path of said flange when said detent means is biased against said stop, whereby said tripping plates are reset to said initial position by engagement of said flange with said detent portion as said main gear is rotated.

6. In an automatic record changer, a tone arm, a main gear having a notch in the periphery thereof, a driving gear having a lug rotatable therewith, detent means normally positioning said main gear so that said notch is opposite said driving gear and said main and driving gears are disengaged, a velocity tripping mechanism including a first tripping plate resting on the upper surface of said main gear and pivotally mounted for limited movement relative to said main gear, and a second tripping plate resting on said first tripping plate and pivotally mounted for limited movement relative to said first plate and said main gear, said first plate having a downturned flange portion positioned within said notch and extending below said main gear, said first and second plates having an initial position in which said flange is spaced a substantial distance from said driving gear, means responsive to inward movement of said tone arm for moving said plates toward said driving gear by engagement with said flange, said second plate having an upturned lug adapted to be engaged by said driving gear lug to initiate rotation of said main gear when said second plate is moved toward said driving gear at a predetermined velocity, said detent means comprising a pin on said main gear, a lever pivotally mounted beyond the edge of said gear and provided with a portion extending inwardly beneath said main gear and having a notch in one edge thereof, and means biasing said lever in the direction to restrain said pin within said notch with a predetermined force which must be overcome to initiate rotation of said main gear, a stop, said biasing means operating to bias said lever against said stop after rotation of said main gear is initiated, said lever portion being positioned in the path of said flange on said first tripping plate when said lever is biased against said stop, whereby said tripping plates are reset to said initial position by engagement of said flange with said lever portion as said main gear is rotated.

7. In an automatic record changer, a tone arm, a base member, means rotatably mounting said tone arm on said base member, a main gear rotatably mounted on said base member and having a notch in the periphery thereof, a turntable rotatably mounted on said base member and having a driving gear on the inner hub thereof, said hub also having a projecting lug associated with said driving gear, detent means normally positioning said main gear so that said notch is opposite said driving gear and said main and driving gears are disengaged, a velocity tripping mechanism including a first tripping plate resting on the upper surface of said main gear and pivotally mounted for limited movement relative to said main gear, a second tripping plate resting on said first tripping plate and pivotally mounted for limited movement relative to said first plate and said main gear, a velocity trip arm positioned beneath said base member and loosely supported for sliding movement relative thereto, said trip arm having a first portion extending upwardly through an opening in said base member close to the pivotal axis of said tone arm and adapted to be engaged as said tone arm moves inwardly toward the center of said turntable and having a second portion extending upwardly through an opening in said base member adjacent said driving gear, said first plate having a downturned flange portion positioned within said notch and extending below said main gear and adapted to be engaged by said second portion of said trip arm as said tone arm moves inwardly, thereby to move both said first and second plates toward said driving gear, and said second plate having an upturned lug adapted to be engaged by said driving gear lug to initiate rotation of said main gear when said second plate is moved toward said driving gear at a predetermined velocity.

8. In an automatic record changer, a tone arm, a base member, means rotatably mounting said tone arm on said base member, a main gear rotatably mounted on said base member and having a notch in the periphery thereof, a turntable rotatably mounted on said base member and having a driving gear on the inner hub thereof, said hub also having a projecting lug associated with said driving gear, detent means normally positioning said main gear so that said notch is opposite said driving gear and said main and driving gears are disengaged, a velocity tripping mechanism including a first tripping plate resting on the upper surface of said main gear and pivotally mounted for limited movement relative to said main gear, a second tripping plate resting on said first tripping plate and pivotally mounted for limited movement relative to said first plate and said main gear, a velocity trip arm positioned beneath said base member and loosely supported for sliding movement relative thereto, said trip arm having a first portion extending upwardly through an opening in said base member close to the pivotal axis of said tone arm and adapted to be engaged as said tone arm moves inwardly toward the center of said turntable and having a second portion extending upwardly through an opening in said base member adjacent said driving gear, said first plate having a downturned flange portion positioned within said notch and extending below said main gear and adapted to be engaged by said second portion of said trip arm as said tone arm moves inwardly, thereby to move both said first and second plates toward said driving gear, said second plate having an upturned lug adapted to be engaged by said driving gear lug to initiate rotation of said main gear when said second plate is moved toward said driving gear at a predetermined velocity, and means positioned in the path of said downturned flange for resetting both said first and second plates as said main gear is rotated.

9. In an automatic record changer, a tone arm, a base member, means rotatably mounting said tone arm on said base member, a main gear rotatably mounted on said base member and having a notch in the periphery thereof, a turntable rotatably mounted on said base member and having a driving gear on the inner hub thereof, said hub also having a projecting lug associated with said driving gear, detent means normally positioning said main gear so that said notch is opposite said driving gear and said main and driving gears are disengaged, a velocity tripping mechanism including a first tripping plate resting on the upper surface of said main gear and pivotally mounted for limited movement relative to said main gear, a second tripping plate resting on said first tripping plate and pivotally mounted for limited movement relative to said first plate and said main gear, a velocity trip arm positioned beneath said base member and loosely supported for sliding movement relative thereto, said trip arm having a first portion extending upwardly through an opening in said base member close to the pivotal axis of said tone arm and adapted to be engaged as said tone arm moves inwardly toward the center of said turntable and having a second portion extending upwardly through an opening in said base member adjacent said driving gear, said first plate having a downturned flange portion positioned within said notch and extending below said main gear and adapted to be engaged by said second portion of said trip arm as said tone arm moves inwardly, thereby to move both said first and second plates toward said driving gear, said second plate having an upturned lug adapted to be engaged by said driving gear lug to initiate rotation of said main gear when said second plate is moved toward said driving gear at a predetermined velocity, means positioned in the path of said downturned flange for resetting both said first and second plates as said main gear is rotated, and means including a pin mounted on said main gear for resetting said velocity trip arm as said main gear is rotated.

10. In an automatic record changer, a tone arm, a base member, means rotatably mounting said tone arm on said base member, a main gear rotatably mounted on said base member and having a notch in the periphery thereof, a turntable rotatably mounted on said base member and having a driving gear on the inner hub thereof, said hub also having a projecting lug associated with said driving gear, a velocity tripping mechanism including a first tripping plate resting on the upper surface of said main gear and pivotally mounted for limited movement relative to said main gear, a second tripping plate resting on said first tripping plate and pivotally mounted for limited movement relative to said first plate and said main gear, a velocity trip arm positioned beneath said base member and loosely supported for sliding movement relative thereto, said trip arm having a first portion extending upwardly through an opening in said base member close to the pivotal axis of said tone arm and adapted to be engaged as said tone arm moves inwardly toward the center of said turntable and having a second portion extending upwardly through an opening in said base member adjacent said driving gear, said first plate having a downturned flange portion positioned within said notch and extending below said main gear and adapted to be engaged by said second portion of said trip arm as said tone arm moves inwardly, thereby to move both said first and second plates toward said driving gear, said second plate having an upturned lug adapted to be engaged by said driving gear lug to initiate rotation of said main gear when said second plate is moved toward said driving gear at a predetermined velocity, a pin on said main gear, a lever pivotally mounted on said base member and provided with a portion extending underneath said main gear and having a notch in one edge thereof, means biasing said lever in the direction to retain said pin within said notch portion with a predetermined detent force which must be overcome to initiate rotation of said main gear, said pin being positioned to reset said velocity trip arm as said main gear rotates.

11. In an automatic record changer, a base member, a main gear rotatably mounted on said base member and carrying a projecting member, means for rotating said gear substantially one revolution during a record changing cycle, a shutoff lever pivotally mounted on said base member and having a hook portion on one side of the pivotal axis thereof and a cam surface on the other side of said pivotal axis, said cam surface being normally positioned outside the path of said projecting member, control means for bodily elevating said main gear while it is rotating during a record changing cycle so that said projecting member engages said cam surface and pivots said shutoff lever, a motor assembly including a motor and a control lever movable from one position in which said motor is energized to another position in which said motor is deenergized, said hook portion of said shutoff lever being positioned to engage said control lever and move the same from said one position to said other position when said shutoff lever is pivoted.

12. In an automatic record changer, a base member, a main gear rotatably mounted on said base member and carrying a projecting member, means for rotating said gear substantially one revolution during a record changing cycle, a shutoff lever pivotally mounted on said base member and having a hook portion on one side of the pivotal axis thereof and a cam surface on the other side of said pivotal axis, said cam surface being normally positioned outside the path of said projecting member, a stop, spring means biasing said shutoff lever against said stop during a record changing cycle, control means for bodily elevating said main gear while it is rotating during a record changing cycle so that said projecting member engages said cam surface and pivots said shutoff lever in one direction against the force of said biasing spring, a motor assembly including a motor and a control lever movable from one position in which said motor is energized to another position in which said motor is deenergized, said hook portion of said shutoff lever being positioned to engage said control lever when said shutoff lever is pivoted in said one direction and said biasing spring being effective to pivot said shutoff lever in the opposite direction after said projecting member has moved away from said cam surface, thereby to move said control lever from said one position to said other position.

13. In an automatic record changer, a base member, a main gear rotatably mounted on said base member and carrying a projecting member, means for rotating said gear substantially one revolution during a record changing cycle, a shutoff lever pivotally mounted on said base member and having a hook portion on one side of the pivotal axis thereof and a cam surface on the other side of said pivotal axis, said cam surface being normally positioned outside the path of said projecting member, a stop, spring means biasing said shutoff lever against said stop during a record changing cycle, a control slide movable between first and second positions, means operative when said control slide is in said first position for bodily elevating said main gear while it is rotating during a record changing cycle so that said projecting member engages said cam surface and pivots said shutoff lever in one direction against the force of said biasing spring, means normally positioning said control slide in said second position, means for moving said control slide from said second position to said first position, a motor assembly including a motor and a control lever movable from one position in which said motor is energized to another position in which said motor is deenergized, said hook portion of said shutoff lever being positioned to engage said control lever when said shutoff lever is pivoted in said one direction and said biasing spring being effective to pivot said shutoff lever in the opposite direction after said projecting member has moved away from said cam surface, thereby to move said control lever from said one position to said other position.

14. In an automatic record changer, a tone arm, a base member, a main gear rotatably mounted on said base member and carrying a projecting member, means for rotating said gear substantially one revolution during a record changing cycle, a shutoff lever pivotally mounted on said base member and having a hook portion on one side of the pivotal axis thereof and a cam surface on the other side of said pivotal axis, said cam surface being normally positioned outside the path of said projecting member, a stop, spring means biasing said shutoff lever against said stop during a record changing cycle, a control slide movable between first and second positions, means operative when said control slide is in said first position for bodily elevating said main gear while it is rotating during a record changing cycle so that said projecting member engages said cam surface and pivots said shutoff lever in one direction against the force of said biasing spring, means normally positioning said control slide in said second position, means responsive to outward movement of said tone arm for moving said control slide from said second position to said first position, a motor assembly including a motor and a control lever movable from one position in which said motor is energized to another position in which said motor is deenergized, said hook portion of said shutoff lever being positioned to engage said control lever when said shutoff lever is pivoted in said one direction and said biasing spring being effective to pivot said shutoff lever in the opposite direction after said projecting member has moved away from said cam surface, thereby to move said control lever from said one position to said other position.

15. In an automatic record changer, a base member, a main gear rotatably mounted on said base member and carrying a projecting member, means for rotating said gear substantially one revolution during a record changing cycle, a shutoff lever pivotally mounted on said base member and having a hook portion on one side of the pivotal axis thereof and a cam surface on the other side of said pivotal axis, said cam surface being normally positioned outside the path of said projecting member, a stop, spring means biasing said shutoff lever against said stop during a record changing cycle, a control slide movable between first and second positions, means operative when said control slide is in said first position for bodily elevating said main gear while it is rotating during a record changing cycle so that said projecting member engages said cam surface and pivots said shutoff lever in one direction against the force of said biasing spring, means normally positioning said control slide in said second position, a control knob, means responsive to rotation of said knob for moving said control slide to a third position, means including a pin carried by said gear for moving said control slide from said third position to said first position, a motor assembly including a motor and a control lever movable from one position in which said motor is energized to another position in which said motor is deenergized, said hook portion of said shutoff lever being positioned to engage said control lever when said shutoff lever is pivoted in said one direction and said biasing spring being effective to pivot said shutoff lever in the opposite direction after said projecting member has moved away from said cam surface, thereby to move said control lever from said one position to said other position.

16. In an automatic record changer, a base member, a main gear rotatably mounted on said base member, a pin rotatable with said main gear, means for rotating said main gear substantially one revolution during a record changing cycle, a spindle mounted on said base member, a record releasing member pivotally mounted in said spindle, a plate slidably mounted on said base member and having a portion in engagement with said record releasing member, said plate being normally positioned in the path of said pin as said main gear is rotated so that said record releasing member is actuated by reciprocation of said plate when said pin is engaged therewith, a control slide movable between first and second positions and normally positioned in said first position, means operative when said control slide is in said second position for bodily elevating said main gear while it is rotating during a record changing cycle and in such manner that said pin does not engage said plate, and control means for moving said control slide from said first position to said second position.

17. In an automatic record changer, a base member, a main gear rotatably mounted on said base member, a pin rotatable with said main gear, means for rotating said main gear substantially one revolution during a record changing cycle, a spindle mounted on said base member, a record releasing member pivotally mounted in said spindle, a plate slidably mounted on said base member and having a portion in engagement with said record releasing member, said plate being normally positioned in the path of said pin as said main gear is rotated so that said record releasing member is actuated by reciprocation of said plate when said pin is engaged therewith, a control slide movable between first and second positions and normally positioned in said first position, a cam portion on said main gear and adapted to engage said control slide when in said second position and bodily elevate said main gear while it is rotating during a record changing cycle and in such manner that said pin does not engage said plate, and control means for moving said control slide from said first position to said second position.

18. In an automatic record changer, a base member, a main gear rotatably mounted on said base member, a pin rotatable with said main gear, means for rotating said main gear substantially one revolution during a record changing cycle, a spindle mounted on said base member, a record releasing member pivotally mounted in said spindle, a plate slidably mounted on said base member and having a portion in engagement with said record releasing member, said plate being normally positioned in the path of said pin as said main gear is rotated so that said record releasing member is actuated by reciprocation of said plate when said pin is engaged therewith, a control slide movable between first and second positions and normally positioned in said first position, a cam portion on said main gear and adapted to engage said control slide when in said second position and bodily elevate said main gear while it is rotating during a record changing cycle and in such manner that said pin does not engage said plate, control means for initially moving said control slide from said first position to said second position and releasably holding said slide in said second position, and means responsive to movement of said gear after it has been elevated for releasing said slide from said second position.

19. In an automatic record changer, a base member, a main gear rotatably mounted on said base member, a pin rotatable with said main gear, means for rotating said main gear substantially one revolution during a record changing cycle, a spindle mounted on said base member, a record releasing member pivotally mounted in said spindle, a plate slidably mounted on said base member and having a portion in engagement with said record releasing member, said plate being normally positioned in the path of said pin as said main gear is rotated so that said record releasing member is actuated by reciprocation of said plate when said pin is engaged therewith, a control slide mounted on said base member and having a tongue portion extending through a slot in said base member, said slot having a notch in one edge thereof, spring means normally positioning said control slide in a first position, control means for moving said slide to a second position in which said tongue portion is positioned within said notch against the force of said spring means, means operative when said control slide is in said second position for bodily elevating said main gear while it is rotating during a record changing cycle and in such manner that said pin does not engage said plate, and means responsive to movement of said main gear for moving said slide out of said notch, whereby said spring means returns said slide to said first position.

20. In an automatic record changer, a tone arm, a base member, a main gear rotatably mounted on said base member, a pin rotatable with said main gear, means for rotating said main gear substantially one revolution during a record changing cycle, a spindle mounted on said base member, a record releasing member pivotally mounted in said spindle, a plate slidably mounted on said base member and having a portion in engagement with said record releasing member, said plate being normally positioned in the path of said pin as said main gear is rotated so that said record releasing member is actuated by reciprocation of said plate when said pin is engaged therewith, a control slide mounted on said base member and having a tongue portion extending through a slot in said base member, said slot having a notch in one edge thereof, spring means normally positioning said control slide in a first position, control means for moving said slide to a second position in which said tongue portion is positioned within said notch against the force of said spring means, means operative when said control slide is in said second position for bodily elevating said main gear while it is rotating during a record changing cycle and in such manner that said pin does not engage said plate, a velocity tripping mechanism including a velocity trip arm positioned beneath said base member and having a portion extending upwardly through an opening therein, means carried by said gear for resetting said velocity trip arm to an initial position by engagement with said upstanding portion, and means on said trip arm and adapted to engage said tongue portion and move said slide out of said notch when said trip arm is reset, whereby said spring means returns said slide to said first position.

21. In an automatic record changer, a base member, a turntable rotatably mounted on said base member, a main gear rotatably mounted on said base member, a pin rotatable with said main gear, a cycling slide mounted for reciprocating movement on said base member, a tone arm pivotally mounted beyond the edge of said turntable and adapted to engage a record deposited thereon, a transverse slot in said slide within which said pin is positioned so that said slide is reciprocated as said main gear is rotated, means defining a notch in one side of said slot, said notch having a portion the edge of which is outside the path of said pin, whereby movement of said pin along said portion of said notch does not produce movement of said slide, and means responsive to movement of said slide as said pin engages the sides of said slot for moving said tone arm relative to said turntable, whereby the total movement of said slide is relatively small while achieving said movement of said tone arm.

22. In an automatic record changer, a base member, a turntable rotatably mounted on said base member, a main gear rotatably mounted on said base member, a pin rotatable with said main gear, a cycling slide mounted for reciprocating movement on said base member, a tone arm pivotally mounted beyond the edge of said turntable and adapted to engage a record deposited thereon, a transverse slot in said slide within which said pin is positioned so that said slide is reciprocated as said main gear is rotated, means defining a notch in one side of said slot, said notch having a first portion the edge of which is outside the path of said pin, whereby movement of said pin along said first portion of said notch does not produce movement of said slide, said notch also having a relatively steep portion connecting said first portion with said slot, whereby movement of said pin along said steep portion produces an abrupt movement of said slide, means responsive to movement of said slide as said pin engages the sides of said slot for moving said tone arm relative to said turntable, and means for depositing said tone arm on a record positioned on said turntable before said pin engages said steep portion of said notch.

23. In an automatic record changer, a tone arm, a rotatable turntable, a base member, a main gear rotatably mounted on said base member, a pin rotatable with said main gear, a cycling slide mounted for reciprocating movement on said base member, a transverse slot in said slide within which said pin is positioned so that said slide is reciprocated as said main gear is rotated, means responsive to movement of said cycling slide for depositing a record on said turntable and positioning said tone arm for engagement with the record after it has been deposited on said turntable, means defining a notch in one side of said slot, said notch having a first portion the edge of which is outside the path of said pin, whereby movement of said pin along said first portion of said notch does not produce movement of said slide, said notch also having a relatively steep portion connecting said first portion with said slot, whereby movement of said pin along said steep portion produces an abrupt movement of said slide, means for exerting a restraining force on said tone arm which prevents said tone arm from skipping inwardly over the initial grooves of the deposited record as said tone arm is engaged therewith, and means responsive to said abrupt movement of said slide for removing said restraining force from said tone arm.

24. In an automatic record changer, a rotatable turntable, a tone arm provided with a stylus adapted to engage the grooves of a record on said turntable, automatic record changing means for supporting a stack of records above said turntable and successively releasing individual records of the stack onto said turntable during successive record changing cycles, said automatic record changing means including a cycling member movable over a longitudinal path during the record changing cycle and means responsive to said longitudinal movement of said cycling member for positioning said tone arm for engagement with the released record after it has been deposited on said turntable, means providing a normal tracking force for said stylus when in engagement with the grooves of a record positioned on said turntable, means for producing a frictional drag on said tone arm during the period said stylus engages the spiral lead in groove portion of a record on said turntable which is sufficient to prevent said stylus from skipping inwardly over the slick surface of the spiral lead-in groove portion of the record but is slight enough to be overcome when the stylus engages the lead-in groove and is led thereby to the initial recorded groove of the record, and means responsive to movement of said cycling member at substantially the end of the record changing cycle for removing said frictional drag and restoring said tracking force to normal.

25. In an automatic record changer, a tone arm, a rotatable turntable, automatic record changing means for supporting a stack of records above said turntable and successively releasing individual records of the stack onto said turntable during successive record changing cycles, said automatic record changing means including a main gear carrying a pin which is positioned within a transverse slot in a cycling slide and means for rotating said main gear so that said slide is movable over a predetermined path during the record changing cycle, means responsive to movement of said cycling slide for positioning said tone arm for engagement with the released record after it has been deposited on said turntable, a pair of members one of which is movable with said tone arm, means for holding said members together so that a predetermined force is required to move one of said members relative to the other, means for restraining the other of said members as said tone arm engages the record deposited on the turntable to prevent said tone arm from skipping inwardly over the initial grooves of the released record as said tone arm is engaged therewith, and means responsive to movement of said slide at substantially the end of the record changing cycle for removing said restraining means from the other of said members.

26. In an automatic record changer, a tone arm, a rotatable turntable, automatic record changing means for supporting a stack of records above said turntable and successively releasing individual records of the stack onto said turntable during successive record changing cycles, said automatic record changing means including a main gear carrying a pin which is positioned within a transverse slot in a cycling slide and means for rotating said main gear so that said slide is movable over a predetermined path during the record changing cycle, means responsive to movement of said cycling slide for positioning said tone arm for engagement with the released record after it has been deposited on said turntable, means for exerting a frictional drag on said tone arm which prevents said tone arm from skipping inwardly over the initial grooves of the released record as said tone arm is engaged therewith, means including a lost motion connection between said pin and said slide for delaying a portion of the movement of said slide until substantially the end of the record changing cycle, and means responsive to said delayed movement of said slide for removing said frictional drag from said tone arm.

27. In an automatic record changer, a base member, a turntable rotatably mounted on said base member, motor means for rotating said turntable, a main gear rotatably mounted on said base member, a pin rotatable with said main gear, a cycling slide mounted for reciprocating movement on said base member, a transverse slot in said slide within which said pin is positioned so that said slide is reciprocated as said main gear is rotated, means defining a notch in one side of said slot, said notch having a portion the edge of which is outside the path of said pin, whereby movement of said pin past said portion of said notch does not produce movement of said slide, a shutoff lever pivotally mounted on said base member, means responsive to movement of said shutoff lever for deenergizing said motor means, spring means for biasing said lever in a predetermined direction, and means carried by said main gear for moving said shutoff lever against the force of said spring biasing means during movement of said pin past said portion.

28. In an automatic record changer, a base member, a main gear rotatably mounted on said base member, a pin rotatable with said main gear, means for rotating said main gear, a cycling slide mounted for reciprocating movement on said base member, a transverse slot in said slide within which said pin is positioned so that said slide is reciprocated as said main gear is rotated, a shutoff lever pivotally mounted on said base member, spring means for biasing said lever in a predetermined direction, means for effectively disengaging said main gear from said cycling slide, and means for moving said shutoff lever against the force of said spring biasing means while said main gear is effectively disengaged from said cycling slide, thereby to distribute the loading on said main gear rotating means.

References Cited by the Examiner

UNITED STATES PATENTS

| | | | |
|---|---|---|---|
| 1,505,856 | 8/1924 | Briggs | 74—50 |
| 2,307,174 | 1/1943 | Wachs | 74—50 |
| 2,697,608 | 12/1954 | Vanderzee et al. | 274—15 |
| 2,939,464 | 6/1960 | Guest | 274—10 |
| 2,950,921 | 8/1960 | Guest | 274—10 |
| 2,959,419 | 11/1960 | Edema | 274—15 |
| 3,066,941 | 12/1962 | Van Antwerp | 274—10 |
| 3,109,656 | 11/1963 | Humby | 274—10 |
| 3,129,007 | 4/1964 | Mestdagh | 274—15 |
| 3,179,419 | 4/1965 | Churchill | 274—15 X |
| 3,189,352 | 6/1965 | Scalera | 274—10 |

NORTON ANSHER, *Primary Examiner.*

W. E. JACKSON, J. F. PETERS, *Assistant Examiners.*

UNITED STATES PATENT OFFICE

CERTIFICATE OF CORRECTION

Patent No. 3,321,205 May 23, 1967

James T. Dennis

It is hereby certified that error appears in the above numbered patent requiring correction and that the said Letters Patent should read as corrected below.

Column 44, line 17, before "longitudinal" insert -- predetermined --; line 26, for "lead in" read -- lead—in --; column 46, after line 17, insert -- 2,803,465 8/1957 Dobrogowski, et al. 274-10 --.

Signed and sealed this 26th day of December 1967.

(SEAL)

Attest:

Edward M. Fletcher, Jr.

Attesting Officer

EDWARD J. BRENNER

Commissioner of Patents